US012700026B2

(12) United States Patent
Kini et al.

(10) Patent No.: US 12,700,026 B2
(45) Date of Patent: Aug. 4, 2026

(54) SYSTEM AND METHOD FOR GENERATING PERSONALIZED EFFICIENCY RECOMMENDATIONS

(71) Applicant: Microsoft Technology Licensing, LLC, Redmond, WA (US)

(72) Inventors: Ritesh Kini, Redmond, WA (US); Edward Tiong, Cambridge, MA (US); Doug Thompson, Redmond, WA (US); Brody Berg, Redmond, WA (US); Martin Jansky, Redmond, WA (US); Mark Timothy Carreon Rivera, Redmond, WA (US); Jennifer Tamara Velagic, Ontario (CA); Lindsay Neboshynsky, Baltimore, MD (US); Tony Tran, Redmond, WA (US); Eva Gyorki, Redmond, WA (US); Julia A. Cheng, Redmond, WA (US); Leena Choi, Redmond, WA (US); James Sanders, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 331 days.

(21) Appl. No.: 17/656,915

(22) Filed: Mar. 29, 2022

(65) Prior Publication Data

US 2023/0316370 A1    Oct. 5, 2023

(51) Int. Cl.
*G06Q 30/00*        (2023.01)
*G06F 3/0482*        (2013.01)
(Continued)

(52) U.S. Cl.
CPC ....... *G06Q 30/0631* (2013.01); *G06F 3/0482* (2013.01); *G06Q 30/0201* (2013.01)

(58) Field of Classification Search
CPC .............. G06Q 30/00; G06Q 30/0601; G06Q 30/0623; G06Q 30/0625
See application file for complete search history.

(56) References Cited

U.S. PATENT DOCUMENTS 8,027,851 B1 * 9/2011 Krishnan ............... G06Q 40/08
                                                       705/4
8,660,912 B1 * 2/2014 Dandekar .............. G06Q 30/02
                                                       705/26.1
(Continued)

FOREIGN PATENT DOCUMENTS

CN        108256119 A        7/2018
EP         3614264 A1        2/2020

OTHER PUBLICATIONS

Namasudra, Suyel, Samir Nath, and Abhishek Majumder. "Profile based access control model in cloud computing environment." 2014 International Conference on Green Computing Communication and Electrical Engineering (ICGCCEE). IEEE, 2014. (Year: 2014).*
(Continued)

*Primary Examiner* — Christopher B Seibert

(57)        ABSTRACT

A system includes: a processor; and memory including instructions that, when executed by the processor, cause the processor to: receive personalization profile parameters from a user of a relevant resource device; calculate a representative utilization of the relevant resource device based on the personalization profile parameters; and generate the recommendation based on the representative utilization and the personalization profile parameters.

20 Claims, 21 Drawing Sheets

(51) Int. Cl.
 G06Q 30/0201 (2023.01)
 G06Q 30/0601 (2023.01)

(56) References Cited

U.S. PATENT DOCUMENTS

| | | | | |
|---|---|---|---|---|
| 2007/0106570 A1* | 5/2007 | Hartman | ............ | G06Q 30/0605 |
| | | | | 705/26.8 |
| 2009/0037291 A1* | 2/2009 | Dawson | ............ | G06Q 30/0603 |
| | | | | 705/27.2 |
| 2009/0282353 A1* | 11/2009 | Halbherr | ............ | G01C 21/3682 |
| | | | | 715/769 |
| 2010/0114654 A1* | 5/2010 | Lukose | ................. | G06Q 30/00 |
| | | | | 705/14.54 |
| 2012/0136756 A1* | 5/2012 | Jitkoff | ................ | G06F 16/9577 |
| | | | | 715/224 |
| 2013/0227675 A1* | 8/2013 | Fujioka | .................. | G06F 9/451 |
| | | | | 726/16 |
| 2013/0254660 A1* | 9/2013 | Fujioka | .................. | A63F 13/12 |
| | | | | 715/741 |
| 2014/0108066 A1* | 4/2014 | Lam | ....................... | G06Q 10/02 |
| | | | | 705/5 |
| 2014/0236756 A1* | 8/2014 | Bourke | ............. | G06Q 30/0631 |
| | | | | 705/26.7 |
| 2014/0380179 A1* | 12/2014 | Bose | ...................... | G06Q 10/10 |
| | | | | 715/738 |
| 2015/0301853 A1* | 10/2015 | Nandyalam | .............. | G06F 9/46 |
| | | | | 718/105 |
| 2016/0171589 A1* | 6/2016 | Glover | .............. | G06Q 30/0631 |
| | | | | 705/26.7 |
| 2017/0213272 A1* | 7/2017 | Mowatt | ............. | G06Q 30/0631 |
| 2018/0089194 A1* | 3/2018 | Kalish | .................... | H04N 19/46 |
| 2018/0225588 A1 | 8/2018 | Khidekel et al. | | |
| 2019/0179944 A1* | 6/2019 | Ungar | ................ | H04L 41/0897 |
| 2020/0125389 A1* | 4/2020 | Palermo | ............. | H04W 28/084 |
| 2020/0310851 A1* | 10/2020 | Featonby | ............. | G06F 9/5027 |
| 2020/0310852 A1* | 10/2020 | Featonby | ............. | G06F 9/5077 |
| 2021/0014113 A1* | 1/2021 | Guim Bernat | ...... | H04L 41/0806 |
| 2021/0240281 A1* | 8/2021 | Knoppert | .......... | H01H 13/7065 |
| 2021/0241346 A1* | 8/2021 | Theocharous | ..... | G06Q 30/0631 |
| 2021/0318911 A1* | 10/2021 | Sastriawan | .......... | G06F 9/3867 |
| 2021/0342199 A1* | 11/2021 | Bhatnagar | .......... | H04L 41/0896 |
| 2021/0389968 A1* | 12/2021 | Majewski | ................ | G06F 9/54 |
| 2022/0124009 A1* | 4/2022 | Metsch | ................. | G06F 21/577 |
| 2022/0300049 A1* | 9/2022 | Dahiya | ................... | G06F 1/324 |
| 2023/0214096 A1* | 7/2023 | Arora | ................. | G06F 3/04817 |
| | | | | 715/764 |

OTHER PUBLICATIONS

Limaye, Ankur, and Tosiron Adegbija. "A workload characterization for the internet of medical things (IoMT)." 2017 IEEE Computer Society Annual Symposium on VLSI (ISVLSI). IEEE, 2017. (Year: 2017).*

Chandrachood, Akshay. "Optimizing Resource Allocation through Telemetry-Based Performance Monitoring." North American Journal of Engineering Research 4.4 (2023). (Year: 2023).*

Bilal, et al., "Finding the Right Cloud Configuration for Analytics Clusters", In Proceedings of the 11th ACM Symposium on Cloud Computing, Oct. 12, 2020, pp. 208-222.

"International Search Report and Written Opinion Issued in PCT Application No. PCT/US23/010538", Mailed Date: Apr. 12, 2023, 11 Pages.

"Applying Machine Type Recommendations for VM Instances", Retrieved from: https://web.archive.org/web/20210803210220/https:/cloud.google.com/compute/docs/instances/apply-machine-type-recommendations-for-instances, Aug. 3, 2021, 6 Pages.

"Optimizing your Cost with Rightsizing Recommendations", Retrieved from: http://web.archive.org/web/20211118053626/https:/docs.aws.amazon.com/cost-management/latest/userguide/ce-rightsizing.html, Nov. 18, 2021, 5 Pages.

Bhagat, et al., "Do More with Less: Introducing Cloud SQL Cost Optimization Recommendations with Active Assist", Retrieved from: https://cloud.google.com/blog/products/databases/reduce-cloud-sql-costs-with-optimizations-by-active-assist, Sep. 28, 2021, 5 Pages.

Burke, Marie, "Rightsizing: The Foundation for Optimizing Your Cloud Infrastructure", Retrieved from: https://www.cloudhealthtech.com/blog/rightsizing-foundation-optimizing-your-cloud-infrastructure, Dec. 18, 2020, 6 Pages.

Saket, et al., "Reduce Service Costs by using Azure Advisor", Retrieved from: https://docs.microsoft.com/en-us/azure/advisor/advisor-cost-recommendations, Jan. 9, 2022, 10 Pages.

Examination report Received for Indian Application No. 202417069163, mailed on Jan. 1, 2026, 8 pages.

* cited by examiner

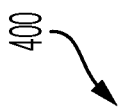
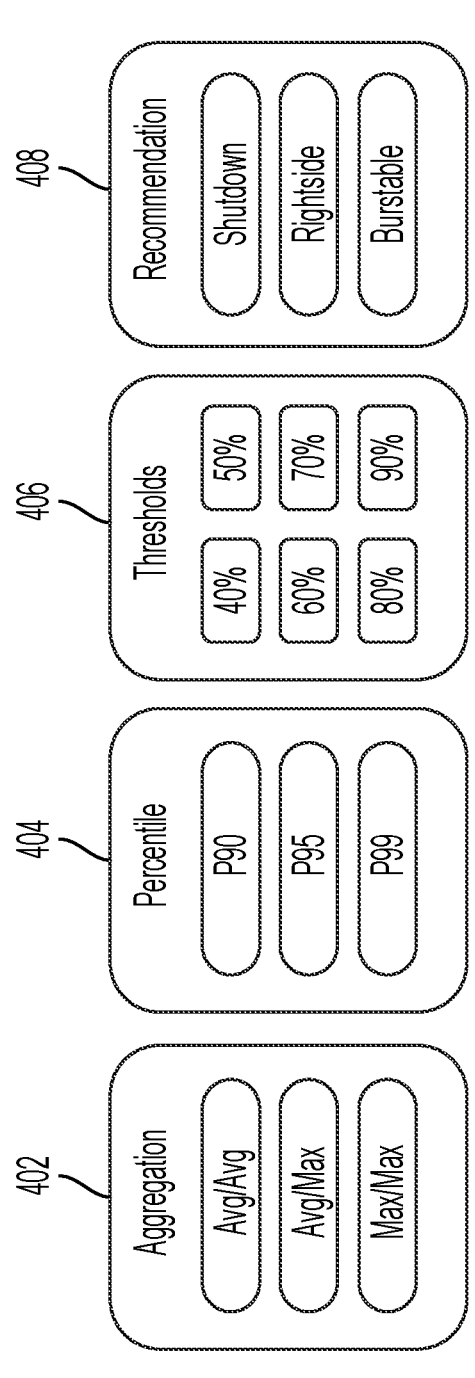
FIG. 4

500

502

| Customer Profile | | CPU/Avg/Avg | CPU/Avg/Max | CPU/Max/Max | Personalized Aggregation (402) | Personalized Percentile (404) | Personalized Threshold (406) | Representative CPU Utilization |
|---|---|---|---|---|---|---|---|---|
| 1 | Very Conservative | [21,22,23,24,25, 26,27,28,29,30] | [51,52,53,54,55, 56,57,58,59,60] | [81,82,83,84,85, 86,87,88,89,90] | Max/Max | P99 | 60% | 90% |
| 2 | Conservative | [21,22,23,24,25, 26,27,28,29,30] | [51,52,53,54,55, 56,57,58,59,60] | [81,82,83,84,85, 86,87,88,89,90] | Avg/Max | P95 | 70% | 60% |
| 3 | Aggressive | [21,22,23,24,25, 26,27,28,29,30] | [51,52,53,54,55, 56,57,58,59,60] | [81,82,83,84,85, 86,87,88,89,90] | Avg/Max | P90 | 80% | 59% |
| 4 | Very Aggressive | [21,22,23,24,25, 26,27,28,29,30] | [51,52,53,54,55, 56,57,58,59,60] | [81,82,83,84,85, 86,87,88,89,90] | Avg/Avg | P90 | 90% | 29% |

| Customer Profile | | CPU/Avg/Avg | CPU/Avg/Max | CPU/Max/Max | Aggregation | Percentile | Threshold | Representative CPU Utilization |
|---|---|---|---|---|---|---|---|---|
| 1 | Very Conservative | [21,22,23,24,25, 26,27,28,29,30] | [51,52,53,54,55, 56,57,58,59,60] | [81,82,83,84,85, 86,87,88,89,90] | Avg/Max | P95 | 80% | 60% |
| 2 | Conservative | [21,22,23,24,25, 26,27,28,29,30] | [51,52,53,54,55, 56,57,58,59,60] | [81,82,83,84,85, 86,87,88,89,90] | Avg/Max | P95 | 80% | 60% |
| 3 | Aggressive | [21,22,23,24,25, 26,27,28,29,30] | [51,52,53,54,55, 56,57,58,59,60] | [81,82,83,84,85, 86,87,88,89,90] | Avg/Max | P95 | 80% | 60% |
| 4 | Very Aggressive | [21,22,23,24,25, 26,27,28,29,30] | [51,52,53,54,55, 56,57,58,59,60] | [81,82,83,84,85, 86,87,88,89,90] | Avg/Max | P95 | 80% | 60% |

| Customer Profile | | CPU Util | Memory Util | Threshold | ShutDown | RightSize | Burstable |
|---|---|---|---|---|---|---|---|
| 1 | Very Conservative | 90% | 90% | 60% | 0 | 0 | 1 |
| 2 | Conservative | 60% | 60% | 70% | 0 | 1 | 1 |
| 3 | Aggressive | 59% | 59% | 80% | 1 | 1 | 1 |
| 4 | Very Aggressive | 29% | 29% | 90% | 1 | 1 | 1 |

Equation (1):   $E = \begin{cases} (c_i, r_j), & \text{if } df[c_i, r_j] = 1 \\ None, & \text{otherwise} \end{cases}$

| Size | vCPU | Memory: GiB |
|------|------|-------------|
| D - Series | | |
| Standard_D2_v3 | 2 | 8 |
| Standard_D4_v3 | 4 | 16 |
| Standard_D8_v3 | 8 | 32 |
| Standard_D16_v3 | 16 | 64 |
| E - Series | | |
| Standard_E2_v3 | 2 | 16 |
| Standard_E4_v3 | 4 | 32 |
| Standard_E8_v3 | 8 | 64 |
| Standard_E16_v3 | 16 | 128 |
| F - Series | | |
| Standard_F2s_v2 | 2 | 4 |
| Standard_F4s_v2 | 4 | 8 |
| Standard_F8s_v2 | 8 | 16 |
| Standard_F16s_v2 | 16 | 32 |

| Customer | Profile | CPU Util | Memory Util | Current SKU | Current SKU CoreACU | Current SKU Memory | Required CoreACU | Required Memory |
|---|---|---|---|---|---|---|---|---|
| 1 | Very Conservative | 90% | 90% | D8_v3 | 1280 | 32 | 1152 | 28.8 |
| 2 | Conservative | 60% | 60% | D8_v3 | 1280 | 32 | 768 | 19.2 |
| 3 | Aggressive | 59% | 59% | D8_v3 | 1280 | 32 | 755.2 | 18.88 |
| 4 | Very Aggressive | 29% | 29% | D8_v3 | 1280 | 32 | 371.2 | 9.28 |

| K-Rank | SKU | Normalized Distance | Constraint Satisfied? |
|---|---|---|---|
| 1 | D4s_v3 | 0.16 | CPU and Memory capacities are smaller than required |
| 2 | E4s_v3 | 0.22 | CPU and capacity is smaller than required |
| 3 | F4s_v2 | 0.25 | CPU and Memory capacities are smaller than required |
| 4 | D8s_v3 | 0.36 | Satisfied |

502 — Personalized Recommendations

| Customer | Profile | Aggregation | Percentile | Threshold | Right Size? | Current SKU | CPU Util | Memory Util | Rightsize Reco. Outcome |
|---|---|---|---|---|---|---|---|---|---|
| | | | | | | | | 502 | 902 |
| 1 | Very Conservative | Max/Max | P99 | 60% | 0 | D8_v3 | 90% | 90% | Disabled |
| 2 | Conservative | Avg/Max | P95 | 70% | 1 | D8_v3 | 60% | 60% | No recommendation |
| 3 | Aggressive | Avg/Max | P90 | 80% | 1 | D8_v3 | 59% | 59% | No recommendation |
| 4 | Very Aggressive | Avg/Avg | P90 | 90% | 1 | D8_v3 | 29% | 29% | Rightsize to D4_v3 |

552 — Same Recommendations

| Customer | Profile | Aggregation | Percentile | Threshold | Right Size? | Current SKU | CPU Util | Memory Util | Rightsize Reco. Outcome |
|---|---|---|---|---|---|---|---|---|---|
| 1 | Very Conservative | | | | | D8_v3 | 60% | 60% | Rightsize to D4_v3 |
| 2 | Conservative | Avg/Avg | P95 | 90% | 1 | D8_v3 | 60% | 60% | Rightsize to D4_v3 |
| 3 | Aggressive | | | | | D8_v3 | 60% | 60% | Rightsize to D4_v3 |
| 4 | Very Aggressive | | | | | D8_v3 | 60% | 60% | Rightsize to D4_v3 |

SYSTEM AND METHOD FOR GENERATING PERSONALIZED EFFICIENCY RECOMMENDATIONS

BACKGROUND

1. Field

Aspects of the present disclosure relate to systems and methods for generating personalized efficiency recommendations.

2. Description of Related Art

A provider institution, such as a cloud services provider, may provide various services to its users by enabling its users to utilize various resource devices hosted by the provider institution. For example, such a provider institution may provide compute services, database services, disk services, storage services, and/or the like by exposing the various resource devices to its users, and may monetize such services based on the type and/or utilization of the various resource devices by its users.

Some provider institutions may provide recommendations for its users to improve utilization of such resource devices. Typically, such recommendations may be based on rule-based models that use hard-coded values. However, such recommendations may not suit the needs of different users and customers.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

One or more embodiments of the present disclosure are directed to systems and methods for generating personalized efficiency recommendations, and more particularly, to systems and methods for identifying and recommending a suitable resource device based on user-defined personalization profile parameters and utilization data.

According to one or more embodiments of the present disclosure, a system includes a processor and memory. The memory includes instructions that, when executed by the processor, cause the processor to: receive personalization profile parameters from a user of a relevant resource device; calculate a representative utilization of the relevant resource device based on the personalization profile parameters; and generate a recommendation based on the representative utilization and the personalization profile parameters.

This summary section is provided to introduce a selection of concepts in a simplified form that are further described below in the Detailed Description. This summary section is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

The above and other aspects and features of the present disclosure will be more clearly understood from the following detailed description of the illustrative embodiments with reference to the accompanying drawings.

FIG. 4 is a schematic diagram illustrating personalization profile parameters according to one or more embodiments of the present disclosure.

FIG. 5A is a table illustrating representative utilization calculated based on personalization profile parameters according to one or more embodiments of the present disclosure.

FIG. 5B is a table illustrating representative utilization determined based on hard-coded values as a comparative example to FIG. 5A.

FIGS. 8A-8E illustrate various processes of the method of FIGS. 7A-7B.

FIG. 9A is a table illustrating a recommendation generated based on received personalized profile parameters according to one or more embodiments of the present disclosure.

FIG. 9B is a table illustrating a recommendation generated based on hard-coded values as a comparative example.

DETAILED DESCRIPTION

Figure 1:
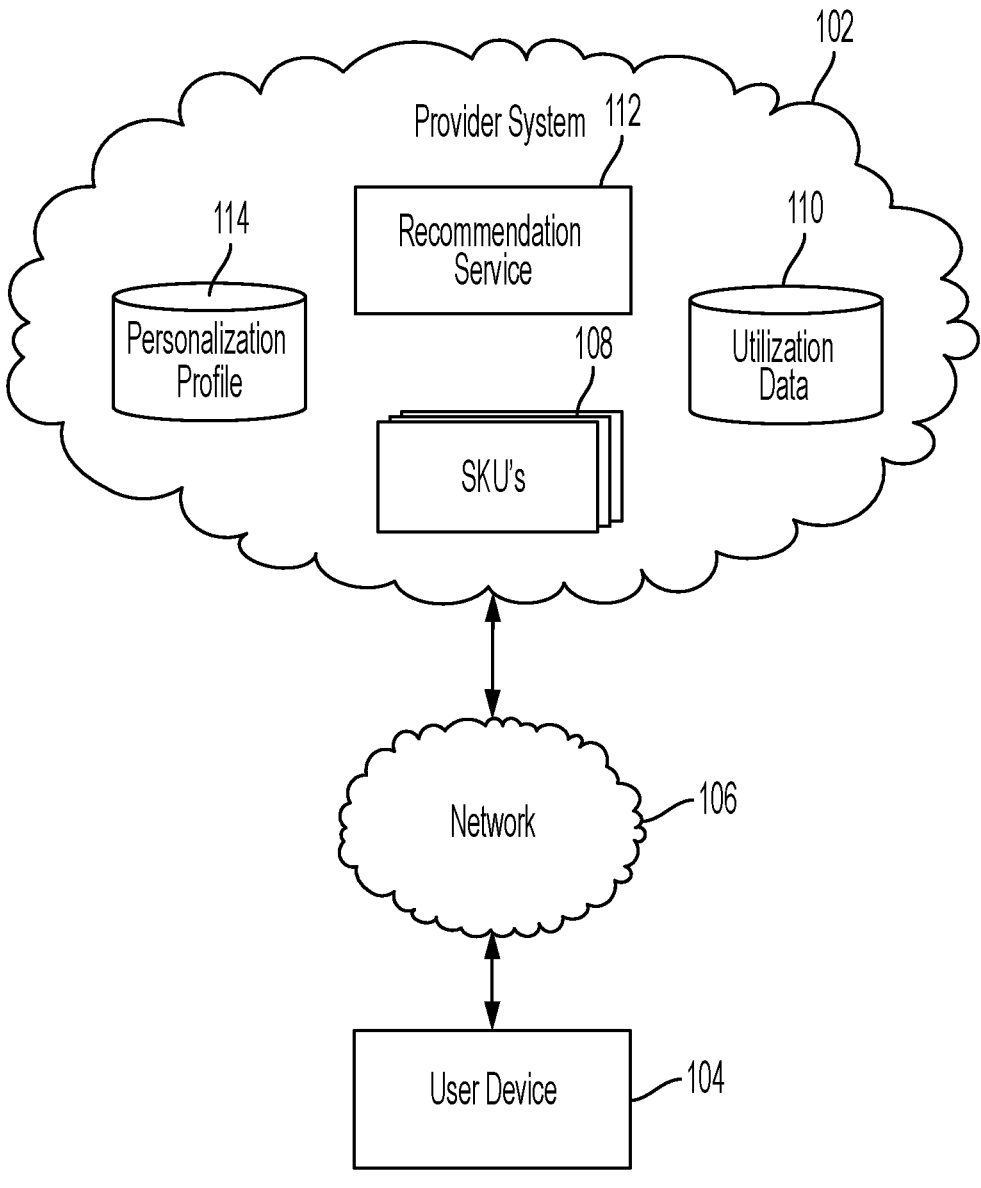
FIG. 1 is a system diagram illustrating a provider system according to one or more embodiments of the present disclosure.

Some provider systems may generate various recommendations based on utilization data of a resource device to enable a user to identify whether the resource device is underutilized, such that the user may appropriately shutdown, reconfigure, replace, or otherwise manipulate the resource device based on the recommendations. A resource device, as used herein, refers to a device or architecture that provides an operating environment for executing computing functionality, such as receiving, processing, and providing data and associated information. Examples of resource devices include server devices, virtual machine devices, personal computers (PCs), mobile devices, and Internet of Things (IoT) devices. Such recommendations, however, are typically generated based on rule-based models that use the same hard-coded values fixed globally regardless of user preferences, effectively suggesting that all users have the same needs. However, users may have different needs that may not be catered to by such recommendations.

For example, some users may be more concerned with system stability, while other users may be more concerned with cost savings and/or increased utilization rates. As another example, some users may be more concerned with monetary cost savings, while other users may be more concerned with carbon emissions cost savings. However, when the recommendations are generated based on rule-based models and hard-coded values, all of the same recommendations are generated and provided to the users, regardless of the recommendations that the user prefers to receive. Accordingly, such recommendations may reduce user experience, while increasing system resources that are used to generate all of the recommendations for each of the users.

Further, such recommendations generated based on hard-coded values may be rigid, and the logic thereof becomes linearly more complex as new constraints and features are added. For example, when recommendations are generated based on hard-coded values for users having the same telemetry data but with different profiles, the recommendations may be the same regardless of the different profiles. Thus, while recommendations that are generated based on rule-based models and hard-coded values may aim to reduce unnecessary spending, such recommendations may not be suitable for users with different goals in mind.

According to embodiments of the present disclosure, a provider system generates one or more personalized recommendations based on received personalized profile parameters to cater to the needs of different users. These personalized profile parameters are used as inputs in one or more recommendation models to generate the one or more personalized recommendations. Personalization profile parameters, as used herein, refer to values and/or options used to configure the operational performance of a resource device. Examples of personalization profile parameters include data aggregation parameters, performance percentile parameters, recommendation type/category parameters, and recommendation threshold parameters.

According to embodiments, by parameterizing the personalized profile parameters, the user is enabled to define which of various recommendations are to be generated. For example, the personalized profile parameters may include various recommendation preference parameters, and the user may select one or more of the recommendation preference parameters to identify the personalized recommendations that the user desires to receive. Thus, rather than generating and providing all possible recommendations for all users, the users may select the desired recommendations that they would like to receive, which may effectively "turn off" the generation of the undesired recommendations. Accordingly, resources of the provider system are spared from generating unnecessary recommendations.

For example, when the user is unable to define which recommendations are to be generated, the provider system generates all of the recommendations for all of the users, and these recommendations are typically generated sequentially. However, according to embodiments, because the user may effectively "turn off" the recommendations that are undesired, the provider system may selectively generate only the recommendations selected by the user. Further, in some embodiments, when the user selects more than one recommendation, the selected recommendations are generated concurrently with each other. Accordingly, latency may be reduced, and the recommendations may be generated more quickly and efficiently.

According to embodiments, the personalized profile parameters may also enable the user to define limits on how the selected recommendations are to be generated by the provider system. For example, the user may select or define various values for parameters defining how utilization data of a relevant resource device are generated, parameters defining how representative utilization of the relevant resource device is calculated or determined from the generated utilization data, and parameters defining threshold limits on the selected recommendations generated by the provider system. Thus, even when the same telemetry data is used for different users having different profiles, the personalized recommendations are catered to the different needs of the users based on the personalization profile parameters provided by the users.

According to embodiments, cross-series recommendations (e.g., rightsize recommendations) may be generated based on machine learning models rather than using brute force search methods. The machine learning models may be used to scope (e.g., to narrow) down the field of potential candidate devices that may be considered as potential replacement devices for the relevant resource device (e.g., a current resource device). Thus, searching for a right sized replacement device that can be used instead of the relevant resource device may be improved, even when the number of potential candidate devices are increased. For example, in some embodiments, the provider system uses a KNN (K-Nearest Neighbor) model to provide the rightsize recommendation. Thus, rather than having to compare a capacity of each individual potential candidate devices with a desired capacity using a brute force search method, only a set (e.g., a sub-set) of the potential candidate devices that are closest in capacity with the desired capacity are further considered as the potential replacement devices for the relevant resource device.

The above and other aspects and features of the present disclosure will be described in more detail hereinafter with reference to the figures.

FIG. 1 is a system diagram illustrating a provider system according to one or more embodiments of the present disclosure.

Referring to FIG. 1, a provider system 102 is communicably connected to a user device 104 over a network 106. For example, the provider system 102 may be a cloud services provider system. The provider system 102 may include various resource devices 108 that may be accessible and configurable by a user (e.g., a customer or consumer) to utilize various resource units and services (e.g., compute services, database services, disk services, storage services) provided via one or more of the resource devices 108. A resource unit, as used herein, refers to a distinct type of product or service and corresponding attributes of the product or service (e.g., manufacturer, model, description, size, packaging, material). Examples of resource units include stock keeping units (SKUs) and other unique identifier or codes, such as bar codes and Universal Product Codes (UPCs). For example, the resource devices 108 may include various resource units, compute devices (e.g., general purpose processors, central processing units, and graphics processing units), server components, database components, disk devices, storage devices (e.g., solid state drives and hard disk drives), and/or the like. As is understood, the provider system 102 may include any suitable system hosting one or more suitable resource devices 108 that may be allocated to and/or utilized by the user.

The user may operate the user device 104 to access and/or configure one or more of the resource devices 108 as needed or desired. For example, the user device 104 may include any suitable computing device, such as a desktop computer, a laptop, a tablet, a smart phone, a mobile phone, or the like, that may be communicably connected to the provider system 102 via the network 106. The network 106 may be structured to enable the exchange of data, values, instructions, messages, and/or the like among the provider system 102 and the user device 104. For example, in various embodiments, the network 106 includes any suitable wired or wireless network (e.g., a Local Area Network (LAN), a Wide Area Network (WAN), the Internet, and cellular communications network).

The provider system 102 may monitor utilization of the resource devices 108 to determine a cost associated with using the resource devices 108. For example, as different resource devices 108 may have different costs (e.g., monetary costs, carbon emission costs, and processing time costs) associated with operating and maintaining such resource devices 108, the provider system 102 may maintain various telemetry data for each of the resource devices 108 to calculate the costs associated with each of the resource devices 108. The provider system 102 may include a utilization data datastore 110 to store the telemetry data. For example, in some embodiments, the telemetry data are sampled/collected at predetermined intervals of time (e.g., every 30 seconds or every 1 minute) or upon the occurrence of a predefined event. The provider system 102 may use the telemetry data to calculate the costs associated with the relevant (e.g., the current) resource device (or resource devices) 108 being used by or allocated to a particular user. While the telemetry data that is sampled may depend on the type or kind of resource device(s) 108, some examples of the telemetry data that may be collected and/or maintained include CPU utilization, memory utilization, network traffic, disk space, and the like.

Still referring to FIG. 1, the provider system 102 may further include a recommendation service 112 and a personalization profile datastore 114. The recommendation service 112 may generate and provide various personalized recommendations to a user of the resource devices 108 based on personalization profile parameters received from the user. The personalized recommendations may enable the user to determine whether modifications should be made to the utilization of resource devices 108 as needed or desired, such as to decrease unnecessary spending, consumption, and/or carbon emissions, or to increase utilization of the relevant resource device 108.

For example, as described in more detail below, the user may operate the user device 104 to provide various personalization profile parameters (e.g., see FIG. 4) to the recommendation service 112, which may be stored in the personalization profile datastore 114. The personalization profile parameters are used as inputs to generate the one or more personalized recommendations. For example, the personalization profile parameters may define how telemetry data corresponding to a relevant resource device 108 may be aggregated to generate utilization data for the relevant resource device 108, calculate a suitable representative utilization of the relevant resource device 108 from the utilization data, and generate the personalized recommendations requested by the user based on the representative utilization of the relevant resource device 108. A representative utilization of a resource device, as used herein, refers to a value representing the amount or percentage of a resource device's operational utilization that is needed to achieve a user's stated performance objective in light of the generated utilization data for the resource device. Examples of representative utilization include CPU utilization, memory utilization, and storage utilization.

The personalized recommendation(s) may include any suitable recommendations to enable the particular user to identify and/or make changes to one or more underutilized or overutilized resource devices 108 that are used by and/or allocated to the particular consumer. Such personalized recommendations may include, for example, a shutdown recommendation, a rightsize recommendation, a burstable recommendation, and/or the like. A shutdown recommendation is a recommendation to shut down the relevant resource device 108 or put the resource device 108 in a low power/sleep state, for example, if the relevant resource device 108 has not been used for a predetermined period of time (e.g., 7 days). A rightsize recommendation is a recommendation to identify and/or use a more suitable resource device that may be used instead of (e.g., that may replace) the relevant resource device 108. A burstable recommendation is a recommendation to modify a size or a capacity of the relevant resource device 108 (e.g., when the relevant resource device 108 has such capabilities), for example, based on variable workload performance expectations for the relevant resource device 108.

Figure 2:
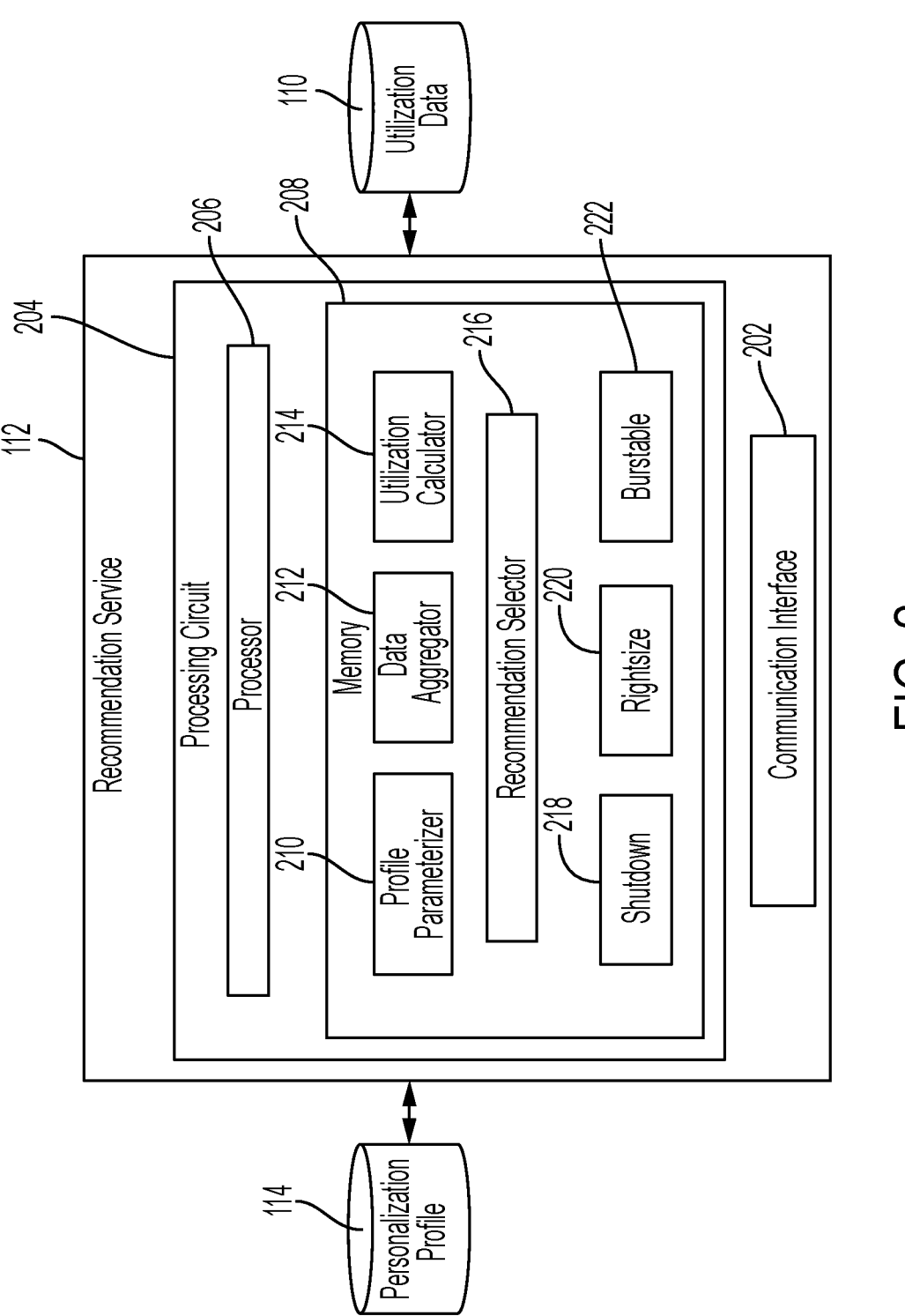
FIG. 2 is a block diagram illustrating a recommendation service according to one or more embodiments of the present disclosure.

FIG. 2 is a block diagram illustrating a recommendation service according to one or more embodiments of the present disclosure.

In brief overview, the recommendation service 112 receives the personalization profile parameters from a user of a relevant resource device (e.g., a current resource device) 108, and may encode the personalization profile parameters as categorical features in one or more recommendation models to generate one or more personalized recommendations related to the relevant resource device 108. In some embodiments, the recommendation service 112 presents (e.g., via a graphical user interface) the personalized recommendations in real-time (or near real-time), for example, as the user submits or modifies values of the personalization profile parameters (e.g., in the graphical user interface). In other embodiments, the recommendation service 112 stores the personalization profile parameters in the personalization profile datastore 114 for subsequent retrieval, and may transmit a notification to the user when the one or more personalized recommendations are available.

For example, in some embodiments, the recommendation service 112 receives (e.g., via a graphical user interface) the personalization profile parameters from the user (e.g., via the user device 104), and receives the personalization profile parameters in response. In some embodiments, the recommendation service 112 generates utilization data by aggregating the telemetry data for the relevant resource device 108, which may be stored in the utilization data datastore 110, based on the received personalization profile parameters. In some embodiments, the recommendation service 112 calculates a suitable representative utilization of the relevant resource device 108 based on the utilization data and the received personalization profile parameters. In some embodiments, the recommendation service 112 generates the one or more personalized recommendations based on the representative utilization calculated for the relevant resource device 108 and the received personalization profile parameters.

In more detail, referring to FIG. 2, the recommendation service 112 includes a communication interface 202 for communicating with the user device 104. For example, in some embodiments, the recommendation service 112 provides a graphical user interface (e.g., see FIG. 10A) to the user device 104 via the communication interface 202 to receive the personalization profile parameters, and may provide one or more personalized recommendations to the user device 104 via the graphical user interface (e.g., see FIG. 10B). The communication interface 202 may be or include wired or wireless communication interfaces (e.g., jacks, antennas, transmitters, receivers, transceivers, wire terminals, and/or the like) for conducting data communications with the user device 104. Communications via the interface 202 can be direct (e.g., local wired or wireless communications) or via the network 106.

For example, the interface 202 may include a Wi-Fi transceiver for communicating via a wireless communications network. In another example, the interface 202 includes an Ethernet card and port for sending and receiving data via an Ethernet-based communications link or network. In another example, the interface 202 includes cellular or mobile phone communications transceivers. In various embodiments, the interface 202 supports various protocols (e.g., TCP/IP, User Datagram Protocol UDP, Hypertext Transfer Protocol HTTP, Internet Message Access Protocol IMAP, Simple Mail Transfer Protocol SMTP, and/or the like) and/or data communication interfaces (e.g., Application Program Interface API, Web Services, and/or the like) for facilitating data communications with the user device 104.

The recommendation service 112 may include one or more processing circuits 204 including one or more processors 206 and memory 208. The processing circuit 204 may be communicably connected to the communication interface 202, such that the processing circuit 204 and the various components thereof can send and receive data via the communication interface 202. The processor 206 may be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The processing circuit 204 and the processor 206 may be housed in a single geographic location or device, or may be distributed over various geographic locations or devices.

The memory 208 (e.g., one or more memory devices, storage devices, and/or memory units) may include tangible, non-transient, volatile memory or non-volatile memory, such as Random Access Memory (RAM), Read-Only Memory (ROM), Non-volatile RAM (NVRAM), Flash Memory, hard disk storage, cloud storage, and/or other suitable electronic storage devices. The memory 208 may be communicably connected to the processor 206 via the processing circuit 204, and includes data and/or computer code for facilitating (e.g., by processing circuit 204 and/or the processor 206) at least some of the various processes described herein. For example, the memory 208 may include database components, object code components, script components, and/or any other type of information structure for supporting the various activities and information structures described in the present application. The memory 208 stores instructions or programming logic that, when executed by the processor 206, controls the operations of the recommendation service 112.

In some embodiments, the memory 208 may include a profile parameterizer 210, a data aggregator 212, a utilization calculator 214, a recommendation selector 216, and a plurality of recommendation generators 218, 220, and 222. Each of the profile parameterizer 210, the data aggregator

212, the utilization calculator 214, the recommendation selector 216, and the plurality of recommendation generators 218, 220, and 222 may be included in the same memory 208 to be executed by the same processor 206 or processing circuit 204, or may be distributed in different memories 208 over various geographic locations or devices to be executed by multiple different processors 206 or processing circuits 204. The recommendation generators 218, 220, and 222 may include one or more suitable recommendation generators to generate suitable personalized recommendations. As shown in FIG. 2, the recommendation generators 218, 220, and 222 may include, for example, a shutdown recommendation generator 218 to generate a shutdown recommendation, a rightsize recommendation generator 220 to generate a rightsize recommendation, and a burstable recommendation generator 222 to generate a burstable recommendation.

As described in more detail below, the profile parameterizer 210 may receive the personalization profile parameters from the user of the relevant resource device 108, and may store the personalization profile parameters in the personalization profile datastore 114. For example, as shown in FIG. 4, the personalization profile parameters may include a data aggregation parameter 402, a percentile parameter 404, a threshold parameter 406, and a recommendation preference parameter 408. The data aggregator 212 may generate the utilization data for the relevant resource device 108, for example, by aggregating the telemetry data for the relevant resource device 108 based on the data aggregation parameter 402. The utilization calculator 214 may calculate a suitable representative utilization for the relevant resource device 108 based on the utilization data and the percentile parameter 404. The recommendation selector 216 may generate a recommendation data structure based on the representative utilization, the threshold parameter 406, and the recommendation preference parameter 408. A recommendation data structure, as used herein, refers to a data management and storage format that is or can be populated with recommendation information related to resource devices and/or resource units. Examples of recommendation data structures include data frames, tables, arrays, lists, hashes, graphs, and trees (e.g., binary trees, multi-way trees, heaps). The recommendation selector 216 may also select/invoke a suitable one or more of the recommendation generators 218, 220, and 222 to generate personalized recommendations for the relevant resource device 108 based on the recommendation data structure.

Figure 3:
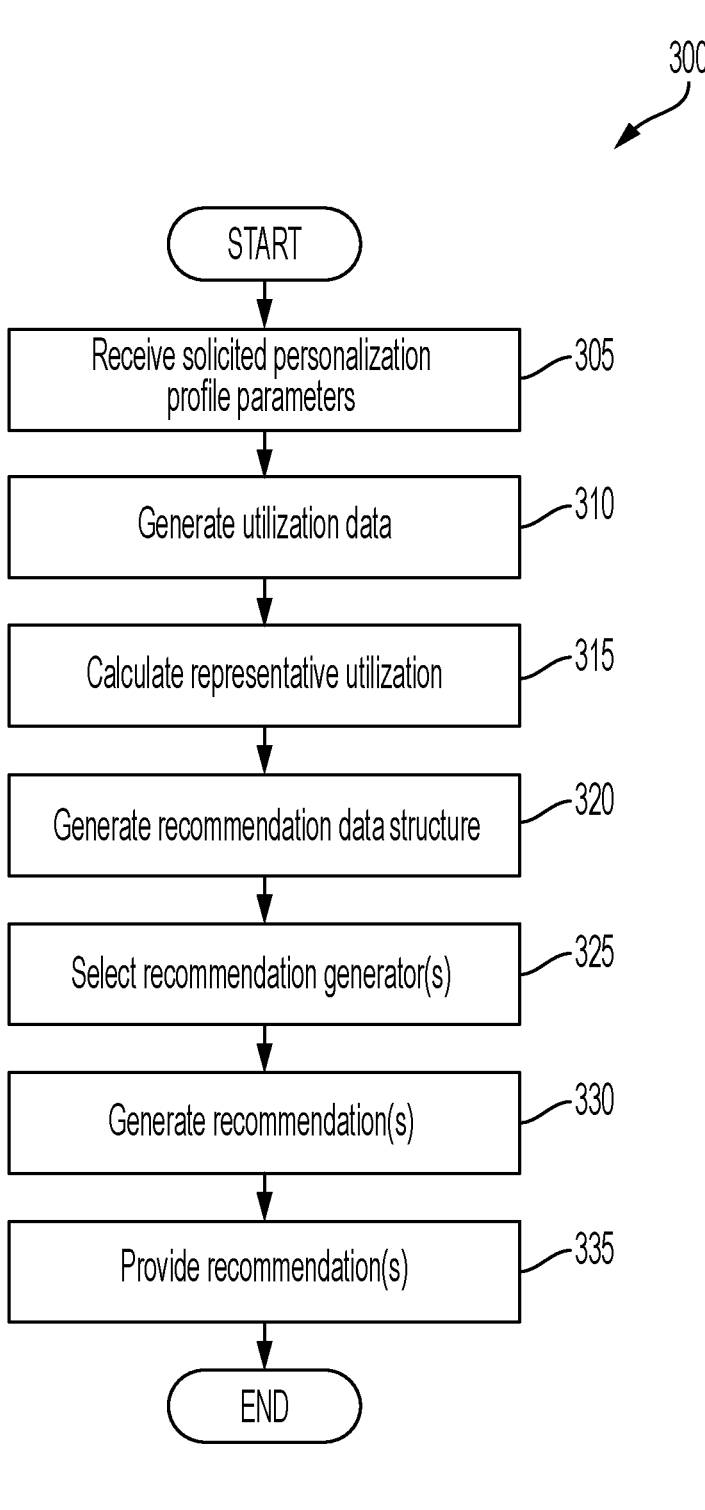
FIG. 3 is a flow diagram illustrating a method for providing a personalized recommendation according to one or more embodiments of the present disclosure.

FIG. 3 is a flow diagram illustrating a method for providing a personalized recommendation according to one or more embodiments of the present disclosure.

While some example representative operations of the method 300 are described in more detail below, the present disclosure is not limited to the sequence or number of the operations of the method 300 shown in FIG. 3, and can be altered into any desired sequence or number of operations as recognized by a person having ordinary skill in the art. For example, the order may vary, or the method 300 may include fewer or additional operations. Further, the operations shown in the method 300 may be performed by any suitable one of the components or any suitable combination of the components of those of one or more example embodiments described above, and thus, are not limited to the examples described below.

Referring to FIG. 3, in brief overview, the method 300 starts, and personalization profile parameters are received at block 305. Utilization data for the relevant resource device 108 is generated at block 310, and representative utilization for the relevant resource device 108 is calculated (or determined) at block 315. A recommendation data structure is generated at block 320, and one or more recommendation generators are selected at block 325. One or more personalized recommendations are generated at block 330, and the generated personalized recommendations are provided to the user (e.g., see FIG. 10B) at block 335, such that the method 300 ends.

FIG. 4 is a schematic diagram illustrating personalization profile parameters according to one or more embodiments of the present disclosure.

Figure 10A:
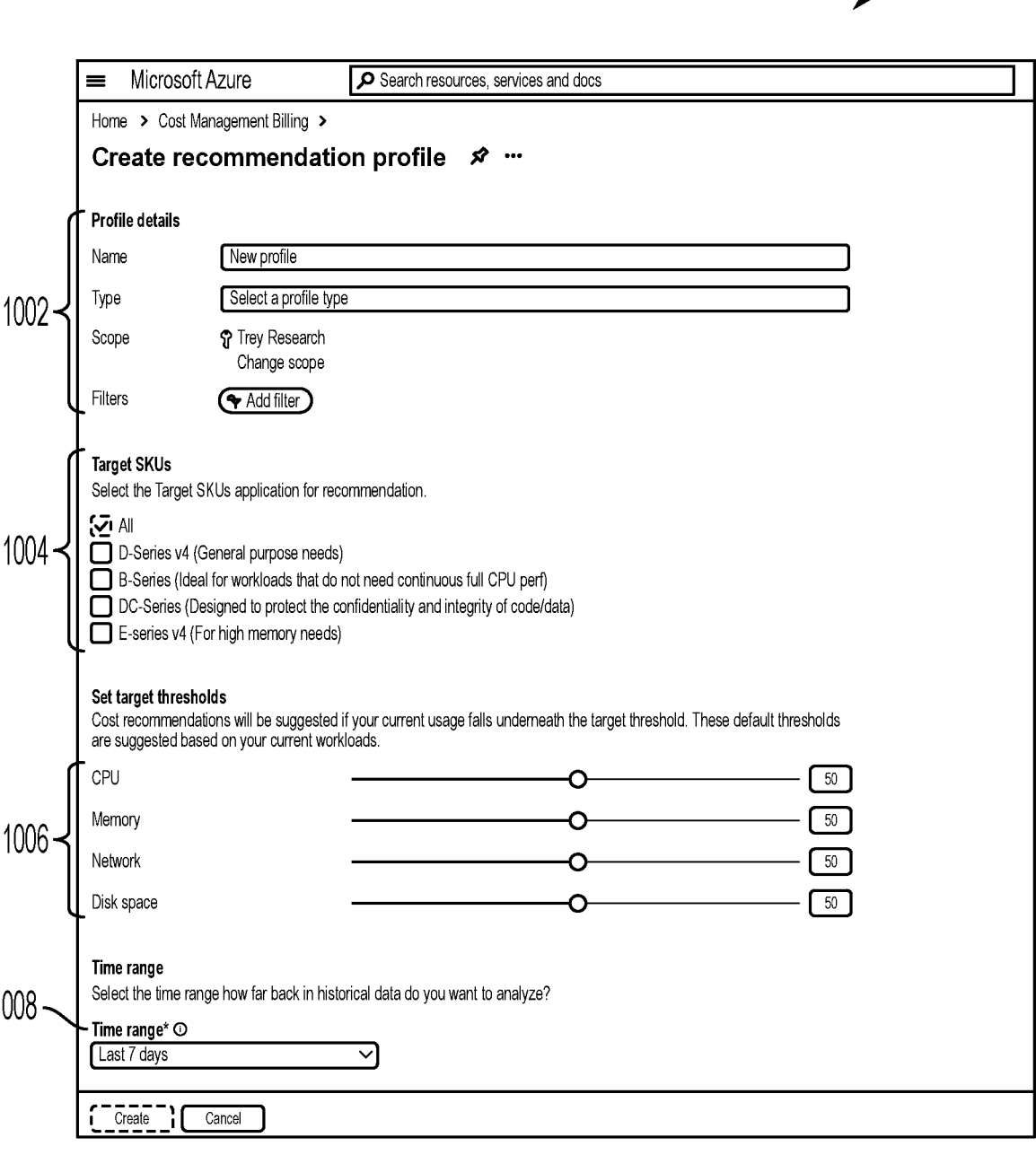
FIGS. 10A-10B illustrate a schematic graphical user interface according to one or more embodiments of the present disclosure.

Referring to FIG. 4 are, in some embodiments, to receive the personalization profile parameters at block 305 (e.g., see FIG. 3), the recommendation service 112 (e.g., the profile parameterizer 210 of FIG. 2) presents various options 400 (e.g., via a graphical user interface) to the user (e.g., via the user device 104 of FIG. 2) to enable the user to provide values for the personalization profile parameters. The options 400 may be presented via a selection menu (as shown in FIG. 4) or through free-form ranges (as shown in FIG. 10A). Thus, instead of using fixed values to generate the recommendations, the options 400 enable the users to choose their preferred values for the personalization profile parameters based on their needs.

The options 400 may enable the users to input any suitable parameters used by the recommendation service 112 to generate the one or more personalized recommendations. For example, as shown in FIG. 4, the options 400 solicit the users to provide their preferred values for the data aggregation parameter 402, the percentile parameter 404, the threshold parameter 406, and/or the recommendation preference parameter 408.

The data aggregation parameter 402 enables the user to specify how the telemetry data for the relevant resource device 108 is aggregated to generate the utilization data used to generate the one or more personalized recommendations. For example, as discussed above, the telemetry data may be sampled at predetermined intervals of time (e.g., every 30 seconds, every 1 minute, and/or the like). However, such sampling granularity may not be necessary for generating the recommendations and may introduce or increase latency. Thus, the aggregation parameter 402 may enable the user to impose limits on how the telemetry data is aggregated for generating the one or more personalized recommendations. The limits may include, for example, a length or range of time, an average utilization rate over a period of time, a maximum utilization rate over a period of time, and/or the like.

For example, values of the aggregation parameter 402 that may be provided or defined by the user may include average/average (Avg/Avg), average/maximum (Avg/Max), and maximum/maximum (Max/Max). In other embodiments, other values or other formats of the values may be provided (e.g., see FIG. 10A). In an embodiment, the average/average (Avg/Avg) value corresponds to average utilization rates that are aggregated over a period of time, and the average utilization rates within a suitable time range are again aggregated to define an average of the average utilization rates. The average/maximum (Avg/Max) value corresponds to average utilization rates that are aggregated over a period of time, and the average utilization rates within a suitable time range are again aggregated to define a maximum of the average utilization rates. The maximum/maximum (Max/Max) value corresponds to maximum utilization rates that are aggregated over a period of time, and the maximum utilization rates within a suitable time range are again aggregated to define a maximum of the maximum utilization rates. Accordingly, in this example, a conservative user primarily interested in system stability may select the maximum/maximum (Max/Max) value, and an aggressive user primarily interested in cost savings may select the average/average (Avg/Avg) value.

The percentile parameter 404 enables the user to specify a percentage of the utilization data that may be used to compute the representative utilization. For example, when the utilization data for the relevant resource device 108 is generated, the utilization rates may be sorted (e.g., according to value). In this case, the percentile parameter 404 defines a percentile (e.g., a top percentile, a bottom percentile, or the like) of the utilization data used to calculate the representative utilization. Thus, for example, the conservative user may select a higher percentile value, such as the 99th percentile (P99), so that a higher percentile of the utilization data may be considered as the representative utilization, whereas the aggressive user may select a lower percentile value, such as the 90th percentile (P90), so that a lower percentile of the utilization data may be considered as the representative utilization.

The threshold parameter 406 enables the user to specify a threshold utilization limit imposed when generating the one or more personalized recommendations. For example, in the case of a shutdown recommendation, the threshold parameter 406 may enable the user to set a utilization limit for when to suggest a shutdown of the relevant resource device 108. As another example, in the case of a burstable recommendation, the threshold parameter 406 may enable the user to set utilization limits for when to suggest a burstable recommendation of the relevant resource device 108. As another example, in the case of a rightsize recommendation, as discussed in more detail below with reference to FIG. 7B, the threshold parameter 406 may enable the user to set threshold limits on the capacity or capability of potential candidate devices to determine if at least one of the potential candidate devices is a sufficient replacement for the relevant resource device 108. Thus, for example, the conservative user may select a lower threshold value (e.g., 60%), whereas the aggressive user may select a higher threshold value (e.g., 90%).

The recommendation preference parameter 408 enables the user to specify one or more of the recommendations that the user desires to receive. Thus, instead of generating all of the recommendations and presenting each of the generated recommendations in a predefined order to each of the users, which may waste resources and may not be catered to different needs of different users, the recommendation service 112 generates only the one or more recommendations specified by the user. For example, a user that is running a production service having low usage on a resource device 108 that is required to be kept running for rare occurrences of an event may constantly receive a shutdown recommendation. However, the user may prefer to receive a rightsize recommendation instead of the shutdown recommendation, as the resource device 108 may not be shut down. In this scenario, the user may select only the rightsize recommendation option (or may deselect the shutdown recommendation option), such that the rightsize recommendation is generated and provided to the user, while the shutdown recommendation is effectively "turned off" (e.g., not generated and/or provided to the customer). Thus, user satisfaction may be improved, and system resources may be reduced by preventing the generation of unnecessary recommendations.

Further, in some embodiments, the one or more selected recommendations may be generated in parallel with each other, and thus, time for generating the one or more personalized recommendations may be reduced. For example, rather than providing all of the recommendations to each of the users, which may be generated sequentially (e.g., in a waterfall fashion), because the user is enabled to specify the preferred recommendations, only those recommendation generator(s) that are selected are invoked to generate the recommendations, and the selected recommendation generator(s) may generate the recommendations concurrently with each other. The recommendation generator(s) that are not selected (or deselected) are effectively turned off so that a corresponding recommendation is not generated by the "turned off" recommendation generator(s). Thus, the selected recommendation generators may generate their corresponding recommendations, while those unselected (or deselected) recommendation generator(s) may not generate their corresponding recommendations.

Accordingly, in some embodiments, the user selects which recommendations are to be generated (e.g., according to the selected recommendation preference parameters 408), such that the recommendations that are not selected are not generated. In some embodiments, when the user selects more than 1 recommendation to be generated, the selected recommendations may be generated concurrently (e.g., simultaneously) with each other. In some embodiments, at least some of the selected recommendations are generated sequentially with each other.

FIG. 5A is a table illustrating representative utilization calculated based on received personalization profile parameters according to one or more embodiments of the present disclosure. FIG. 5B is a table illustrating representative utilization determined based on hard-coded values as a comparative example.

In some embodiments, the recommendation service 112 (e.g., the data aggregator 212) generates the utilization data for the relevant resource device 108 (e.g., at block 310 of FIG. 3) by aggregating and sorting the telemetry data stored in the utilization data datastore 110 based on the data aggregation parameter 402 defined by the user. The recommendation service 112 (e.g., the utilization calculator 214) calculates (or determines) a representative utilization of the relevant resource device 108 (e.g., at block 315 of FIG. 3) based on the utilization data and the percentile parameter 404 defined by the user. The representative utilization is used to generate one or more personalized recommendations. Accordingly, unlike recommendations that are generated based on rule-based models and hard-coded values, which may result in the same representative utilization regardless of the different needs of the users, the representative utilization calculated by the utilization calculator 214 is tailored to the users' needs according to the personalization profile parameters defined by the users.

For example, FIG. 5A shows a table 500 in which a representative utilization 502 is generated for four (4) users (e.g., customers 1 through 4) having different recommendation profiles (e.g., very conservative to very aggressive) based on the received personalization profile parameters 402, 404, and 406 and utilization data 504, according to an embodiment of the present disclosure. FIG. 5B shows a table 550 in which a representative utilization 552 is generated for four (4) users (e.g., customers 1 through 4) having different recommendation profiles (e.g., very conservative to very aggressive) based on hard-coded values 554 and utilization data 556, as a comparative example. For comparative purposes, the utilization data 504 generated for each of the four (4) users are the same with each other. It should be appreciated that, in practice, the utilization data 504 and 556 for each of the four (4) users (e.g., customers 1 through 4) may be different.

As shown in FIG. 5A, when the representative utilization 502 is generated based on the received personalization profile parameters 402, 404, and 406, different representative utilizations 502 are calculated (or determined) for different users with different recommendation profiles, even when the utilization data 504 is the same for each of the different users. For example, for a very conservative user (e.g., customer 1), the representative utilization 502 may be calculated from the CPU/Max/Max utilization data 504 based on the Max/Max data aggregation parameter 402 and the percentile parameter 404 received from the user. In this case, as shown in FIG. 5A, the $99^{th}$ percentile (P99) of the CPU/Max/Max utilization data 504 may result in a representative CPU utilization 502 of 90%. As another example, for an aggressive user (e.g., customer 3), the representative utilization 502 may be calculated from the CPU/Avg/Max utilization data 504 based on the Avg/Max data aggregation parameter 402 and the percentile parameter 404 received from the user. In this case, as shown in FIG. 5A, the $90^{th}$ percentile (P90) of the CPU/Avg/Max utilization data 504 may result in a representative CPU utilization 502 of 59%. Accordingly, as discussed in more detail below with reference to FIG. 9A, when the representative utilization 502 is generated based on the personalization profile parameters, the resulting recommendation may be tailored according to the user's needs.

In comparison, as shown in FIG. 5B, when the representative utilization 552 is generated based on hard-coded values 554, the same representative utilizations 552 are calculated for different users irrespective of their needs. For example, when the data aggregation parameter is hard-coded (e.g., to Avg/Max) and the percentile parameter is hard-coded (e.g., to P95), the resulting representative CPU utilization 552 is the same (e.g., 60%) irrespective of the different needs of the different users (e.g., customer 1 through 4). Thus, as discussed in more detail below with reference to FIG. 9B, when the representative utilization 552 is generated based on hard-coded values 554, the resulting recommendations are the same irrespective of the user's needs.

For comparative purposes, the same utilization data 510 and 556 are shown in FIGS. 5A and 5B for each of the data aggregation parameters 402 for each of the four (4) users (e.g., customers 1 through 4). In embodiments, because the telemetry data for a relevant resource device 108 may be aggregated based on the data aggregation parameter 402 defined by the user, the recommendation service 112 (e.g., the data aggregator 212) may not generate the utilization data 504 for the other data aggregation parameters 402 that are not selected by the user, or may retrieve only the utilization data 504 (e.g., stored in the utilization data datastore 110) for the relevant resource device 108 based on the selected data aggregation parameter 402.

Figure 6:
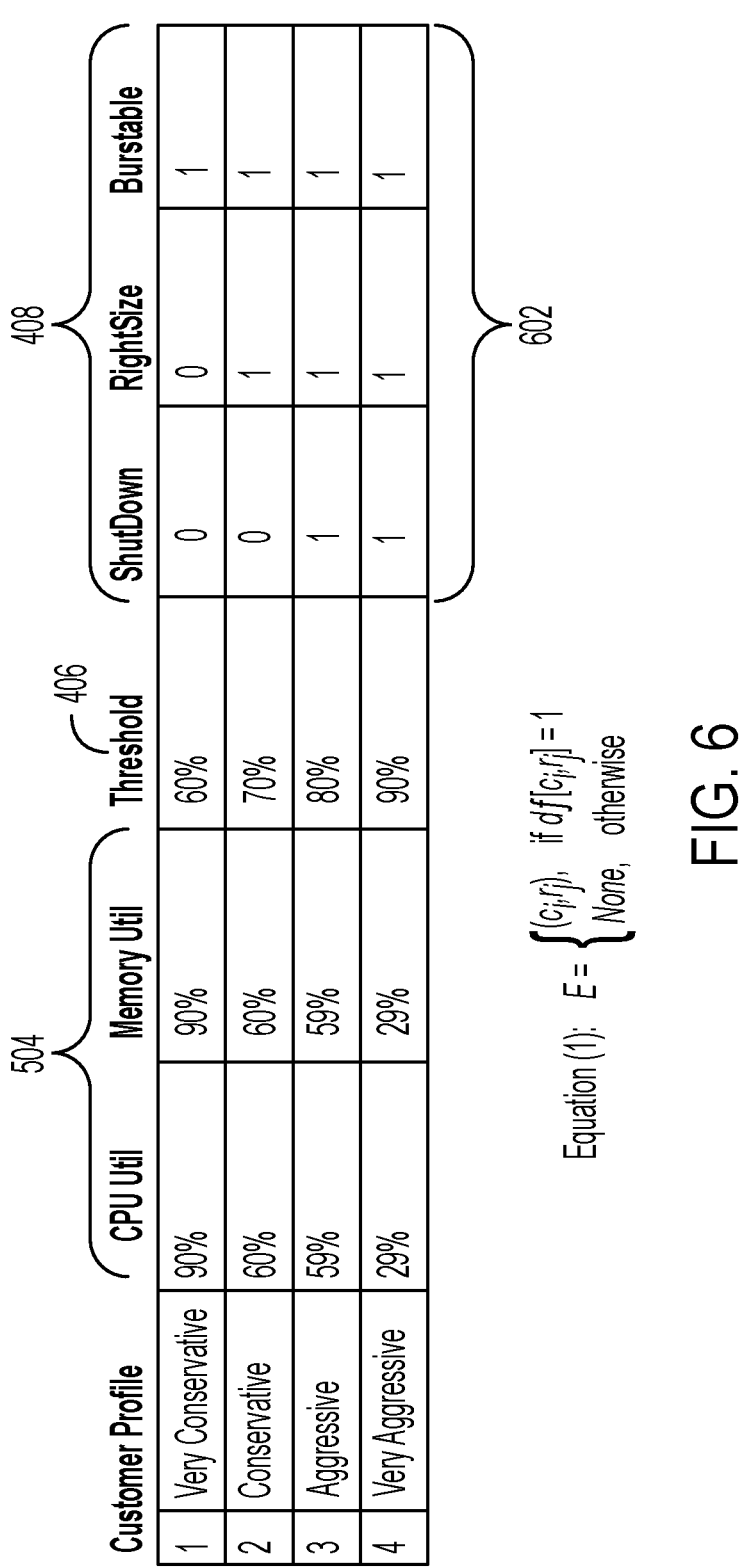
FIG. 6 illustrates encoded features of a recommendation data structure according to one or more embodiments of the present disclosure.

FIG. 6 illustrates encoded features of a recommendation data structure according to one or more embodiments of the present disclosure.

In some embodiments, the recommendation data structure is generated by the recommendation service 112 (e.g., by the recommendation selector 216 at block 320 of FIG. 3), and the recommendation service 112 (e.g., the recommendation selector 216) selects or invokes (e.g., at block 325 of FIG. 3) one or more of the recommendation generators 218, 220, and 222 (e.g., based on the recommendation preference parameters 408 of FIG. 4) to generate one or more personalized recommendations based on the recommendation data structure. For example, the recommendation data structure may be a dataframe including the representative utilization 502, the threshold parameter 406 defined by the user, and the recommendation preference parameter(s) 408 defined by the user. The recommendation data structure may be compiled by the recommendation service 112 (e.g., the recommendation selector 216) to filter (e.g., to select/invoke) and prioritize the recommendations generated by the recommendation generators 218, 220, and 222.

For example, as shown in FIG. 6, the recommendation service 112 (e.g., the recommendation selector 216) may encode the selected values of the recommendation preference parameters 408 by the user into a set of binary features representing the user's needs. For example, each of the recommendation preference parameters 408 may be encoded as a binary variable 602 in the recommendation data structure, and converted at edges according to Equation (1) to determine whether the user receives a particular recommendation or not. In Equation (1), E represents a set of edges representing the user's preferred recommendations, df represents a data structure containing all users and binary encoding, $c_i$ represents the $i^{th}$ user, and $r_j$ represents the $j^{th}$ recommendation. In this example, if a binary representation of a particular recommendation preference is equal to one (1), the particular recommendation is generated; otherwise, the particular recommendation is not generated.

Thus, the recommendation data structure is used to invoke one or more suitable recommendation generators 218, 220, and 222 to generate the personalized recommendations selected by the user. As discussed in more detail below with reference to FIGS. 7A and 7B, the selected recommendation generators 218, 220, and 222 generate their respective recommendations (e.g., at block 330 of FIG. 3) using the calculated representative utilization 502 and the threshold parameter 406 defined by the user, which may be encoded in the recommendation data structure, and the generated personalized recommendations are provided (e.g., at block 335 of FIG. 3) to the user (e.g., see FIG. 10B).

Figure 7A:
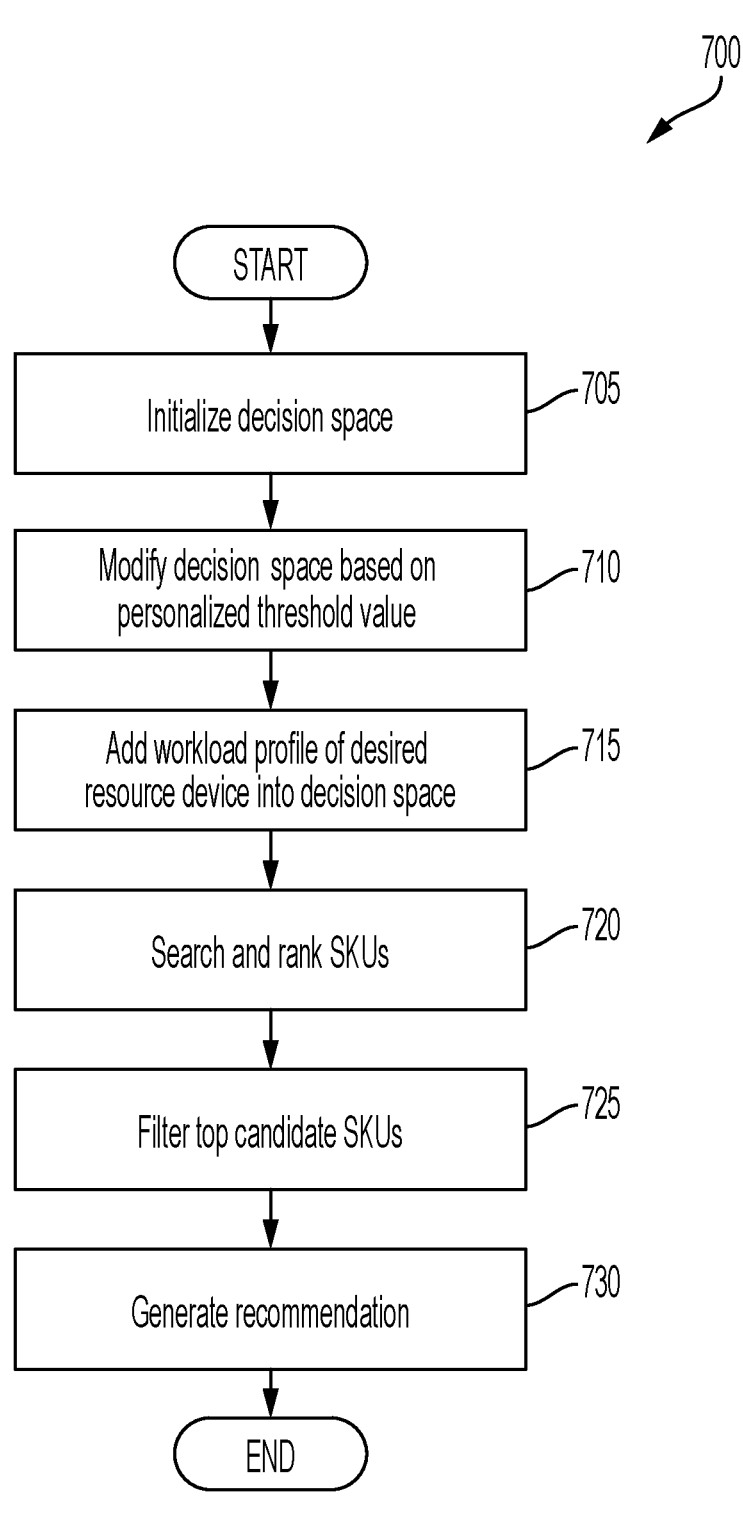
FIGS. 7A-7B are flow diagrams illustrating a method of generating a personalized recommendation according to one or more embodiments of the present disclosure.
Figure 7B:
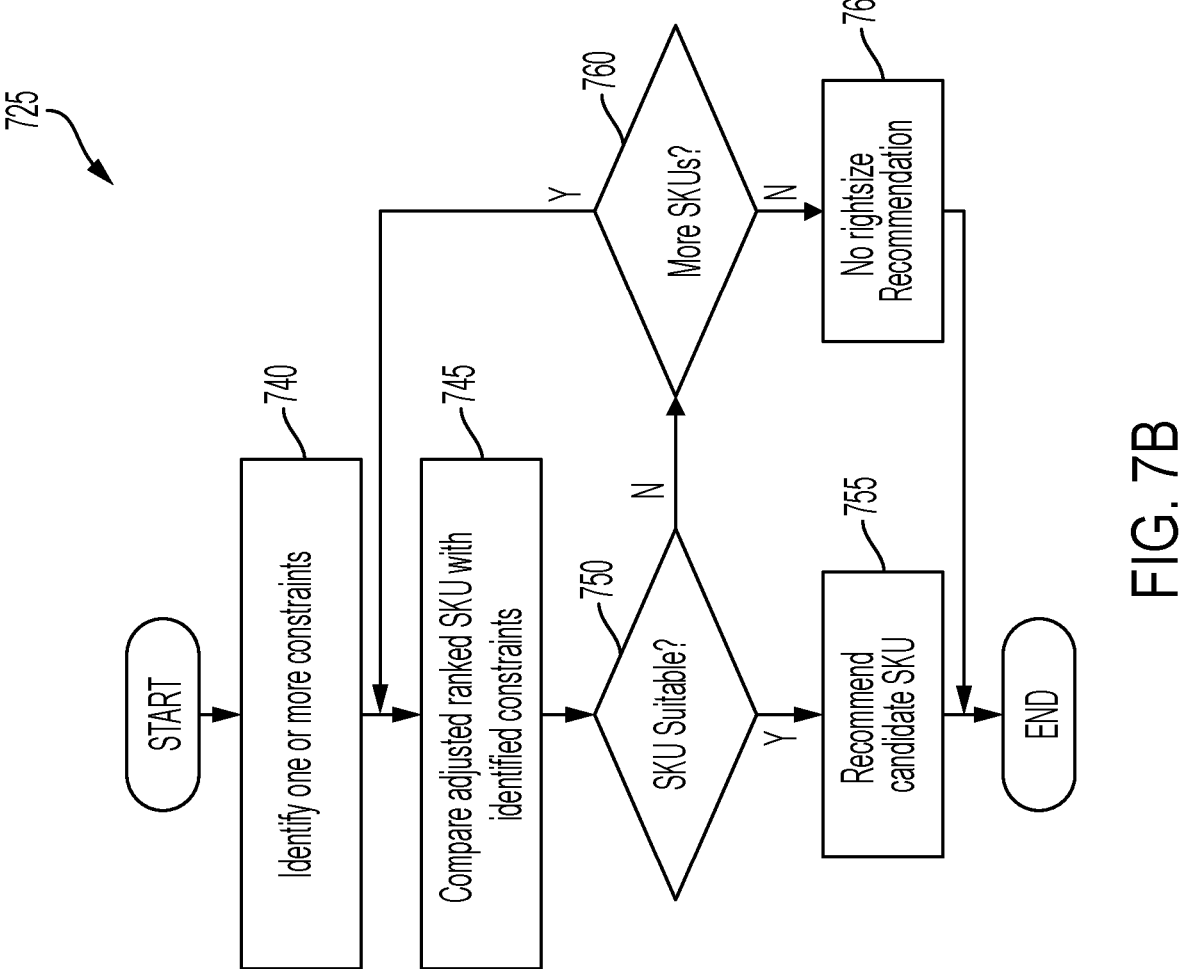

FIGS. 7A-7B are flow diagrams illustrating a method of generating a personalized recommendation according to one or more embodiments of the present disclosure. In some embodiments, the method 700 shown in FIG. 7A is performed by one or more of the selected recommendation generators 218, 220, and 222 to generate the one or more personalized recommendations at block 330 of the method 300. For convenience of illustration and description, the method 700 in FIGS. 7A-7B illustrate a method of generating a rightsize recommendation. The shutdown recommendation and the burstable recommendation may be similarly generated according to the personalized profile parameters (e.g., according to the calculated representative utilization 502 and the threshold parameter 406 defined by the user).

While some example representative operations of the method 700 are described in more detail below, the present disclosure is not limited to the sequence or number of the operations of the method 700 shown in FIGS. 7A and 7B, and can be altered into any desired sequence or number of operations as recognized by a person having ordinary skill in the art. For example, the order varies, or the method 700 includes fewer or additional operations. Further, the operations shown in the method 700 may be performed by any suitable component or any suitable combination of the components of those of example embodiments described above, and thus, are not limited to the examples described below.

In some embodiments, the rightsize recommendation is provided to enable the user to identify a replacement resource device from among a plurality of potential candidate devices for the relevant resource device 108. In some embodiments, the rightsize recommendations are generated by considering an increased number of potential candidate devices that the user can utilize for replacing the relevant resource device 108, while reducing the complexity of the search space. For example, there may typically be six (6) potential candidate devices within a series. A series, as used herein, refers to a category of a resource unit, a service, a resource device, or a combination thereof. In examples, each series may be configured to be implemented in a particular execution environment. As a specific example, an A-series SKU for a virtual machine (VM) may be configured to execute on a first set of hardware and processor configurations (e.g., representing a high performance environment) and a B-series SKU for a VM may be configured to execute on a second set of hardware and processor configurations (e.g., representing a moderate to low performance environment).

When potential candidate devices across multiple series (e.g., cross-series) are further considered, that number of potential candidate devices may increase significantly (e.g., by a factor of three (3), six (6), ten (10), or the like), which may increase the possibility of finding a suitable resource device 108 from among the potential candidate devices having a better fit and greater cost-savings (e.g., monetary cost savings, carbon emission cost saving, and/or the like) when compared to the relevant resource device 108. Thus, when generating rightsize recommendations using fixed-rules and brute force search methods, as the number of potential candidate devices are increased, the search complexity may increase linearly, and thus, each of the potential devices that may need to be individually considered may also increase.

According to one or more embodiments of the present disclosure, rather than using brute force search to consider each of the potential candidate devices individually to identify a match, a machine learning model may be used to identify a suitable resource device from among a set (e.g., a sub-set) of closest potential candidate devices that could be a better fit for the user's needs when compared to the relevant resource device 108. For example, the rightsize recommendation generator 220 may use a KNN (e.g., K-Nearest neighbor) model to effectively prune the search space, while identifying a suitable resource device 108 based on the user's needs (e.g., hosting the user's virtual machine). Thus, rather than individually considering whether each of the potential devices is a better fit, the rightsize recommendation generator 220 considers the set (e.g., the sub-set) of closest potential candidate devices having a similar workload profile as that of a desired resource device (e.g., a hypothetical resource device).

For example, referring to FIG. 7A, as discussed in more detail below, the method 700 starts, and a decision space is initiated at block 705. The decision space is modified according to the personalized threshold value at block 710, and a workload profile of a desired resource device (e.g., a hypothetical resource device) is added into the decision space at block 715. The potential candidate devices are searched and ranked at block 720, and the top ranked potential candidate devices are filtered at block 725. A recommendation is generated at block 730, and the recommendation is provided to the user at block 335 of FIG. 3 (e.g., via a graphical user interface).

As discussed in more detail below, referring to FIG. 7B, to filter the top ranked potential candidate devices at block 725 of the method 700, one or more constraints are identified at block 740, and an adjusted ranked candidate device is compared with the identified one or more constraints at block 745. A determination is made whether a currently considered candidate device satisfies the identified constraints at block 750, and if so ("Y" at block 750), the currently considered candidate device is recommended at block 755. On the other hand, if the currently considered candidate device does not satisfy the identified constraints ("N" at block 750), a determination is made as to whether there are more adjusted ranked candidate devices to be compared with the identified constraints at block 760. If so ("Y" at block 760), the other adjusted ranked candidate devices are compared with the identified constraints at block 745. If not ("N" at block 760), a no rightsize recommendation is generated at block 765. Once a suitable candidate device is identified at block 755 or a no rightsize recommendation is generated at block 765, the method of block 725 may end, such that the recommendation (e.g., the recommended candidate device at block 755 or the no rightsize recommendation at block 765) is generated at block 730 shown in FIG. 7A, and the recommendation is provided to the user at block 335 of FIG. 3 (e.g., via a graphical user interface).

FIGS. 8A-8E illustrate various processes of the method 700 of FIGS. 7A-7B.

Figure 8A:
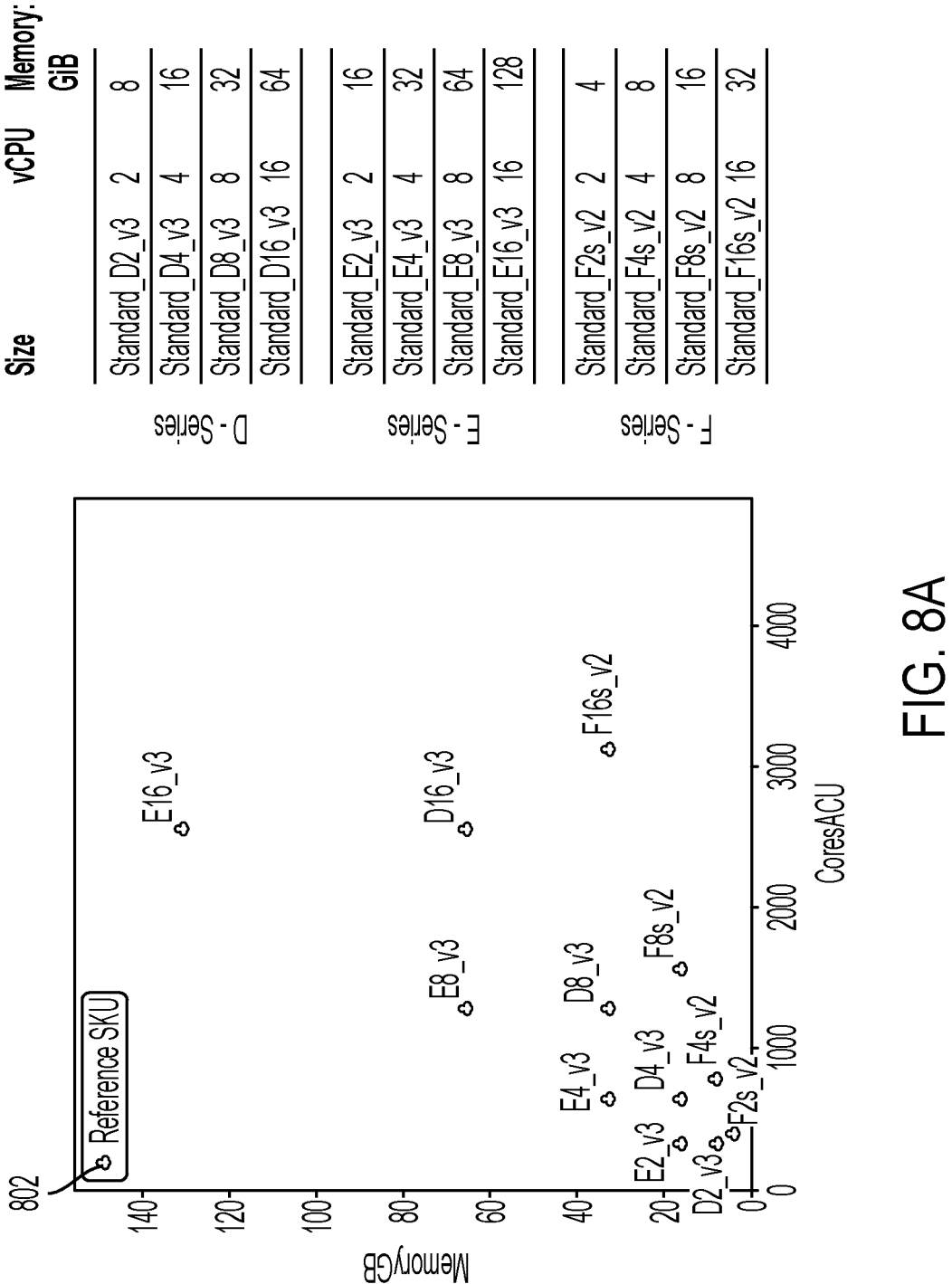

Referring to FIG. 8A, to initialize the decision space at block 705 of FIG. 7A, a set of potential candidate devices 802 (e.g., a set of SKU candidates) are initialized (e.g., are included or identified) in a multi-dimensional decision space according to their design specifications (e.g., capacity or capability). The example shown in FIG. 8A illustrates that twelve (12) potential candidate devices are identified in a 2-dimensional decision space, such as memory capacity (MemoryGB) and CPU (e.g., CoresACU). It should be appreciated that any suitable number of potential candidate devices may be included in the decision space, and the dimensions of the decision space may depend on a type or kind of the relevant resource device 108 and the personalized recommendation that is being generated. Accordingly, the decision space may include all of the potential candidate devices according to their relevant specifications that may be considered when generating a rightsize recommendation for the relevant resource device 108.

Figure 8B:
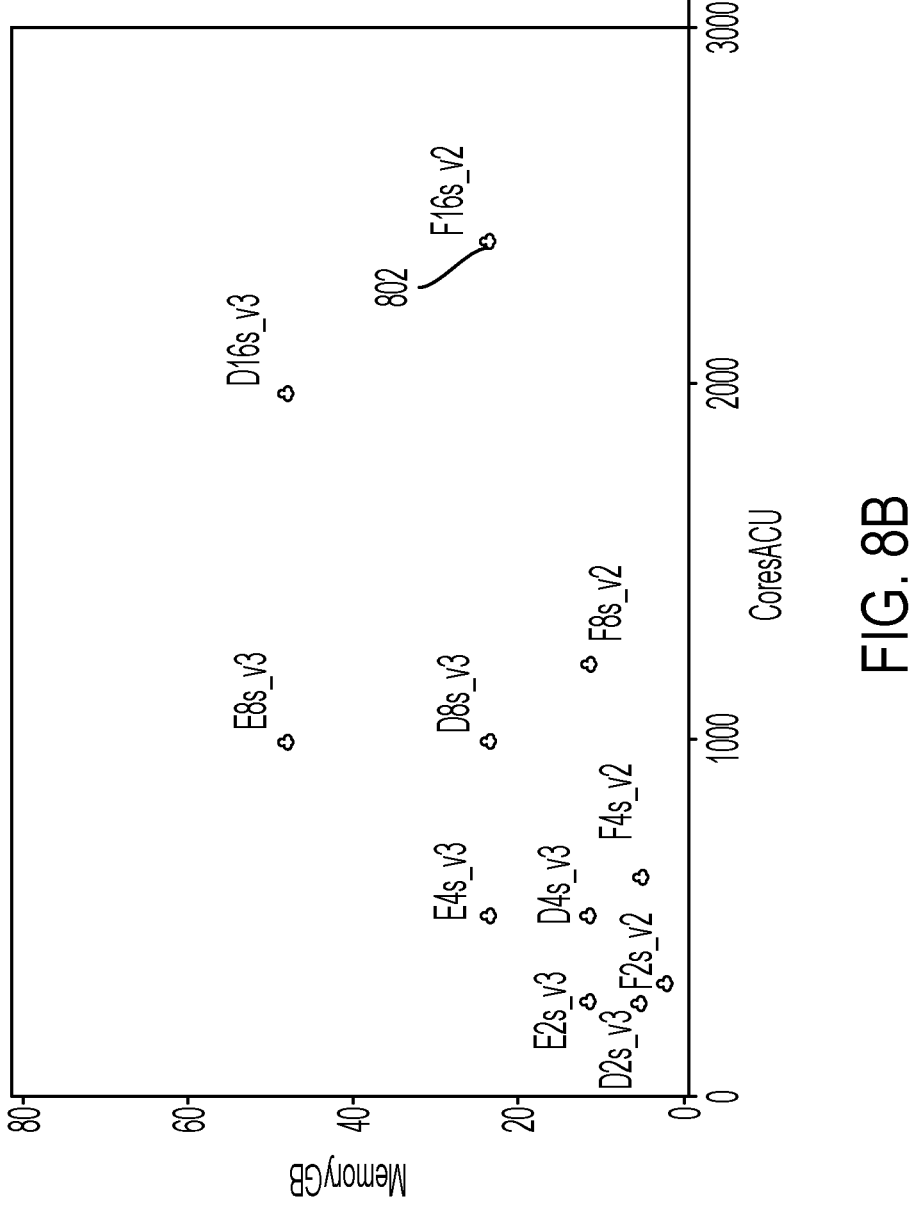

Referring to FIG. 8B, to modify the decision space according to the personalized threshold value at block 710 of FIG. 7A, adjusted CPU and memory capacities of each of the potential candidate devices 802 are calculated (e.g., decreased or "shrunk") according to the received threshold parameter 406. For example, for a user defining an 80% threshold, a potential candidate device 802 having a size of 10 cores and 100 GB of memory will be decreased to 8 cores and 80 GB of memory to represent the user's acceptable upper bound. Thus, returning to the example shown in FIGS. 8A and 8B, a potential candidate device 802 (e.g., F16s_v2) may be adjusted to a CoreACU size of approximately 2000 for a user defining a 60% threshold versus a CoreACU size of approximately 3000 for a user defining a 90% threshold.

Figure 8C:
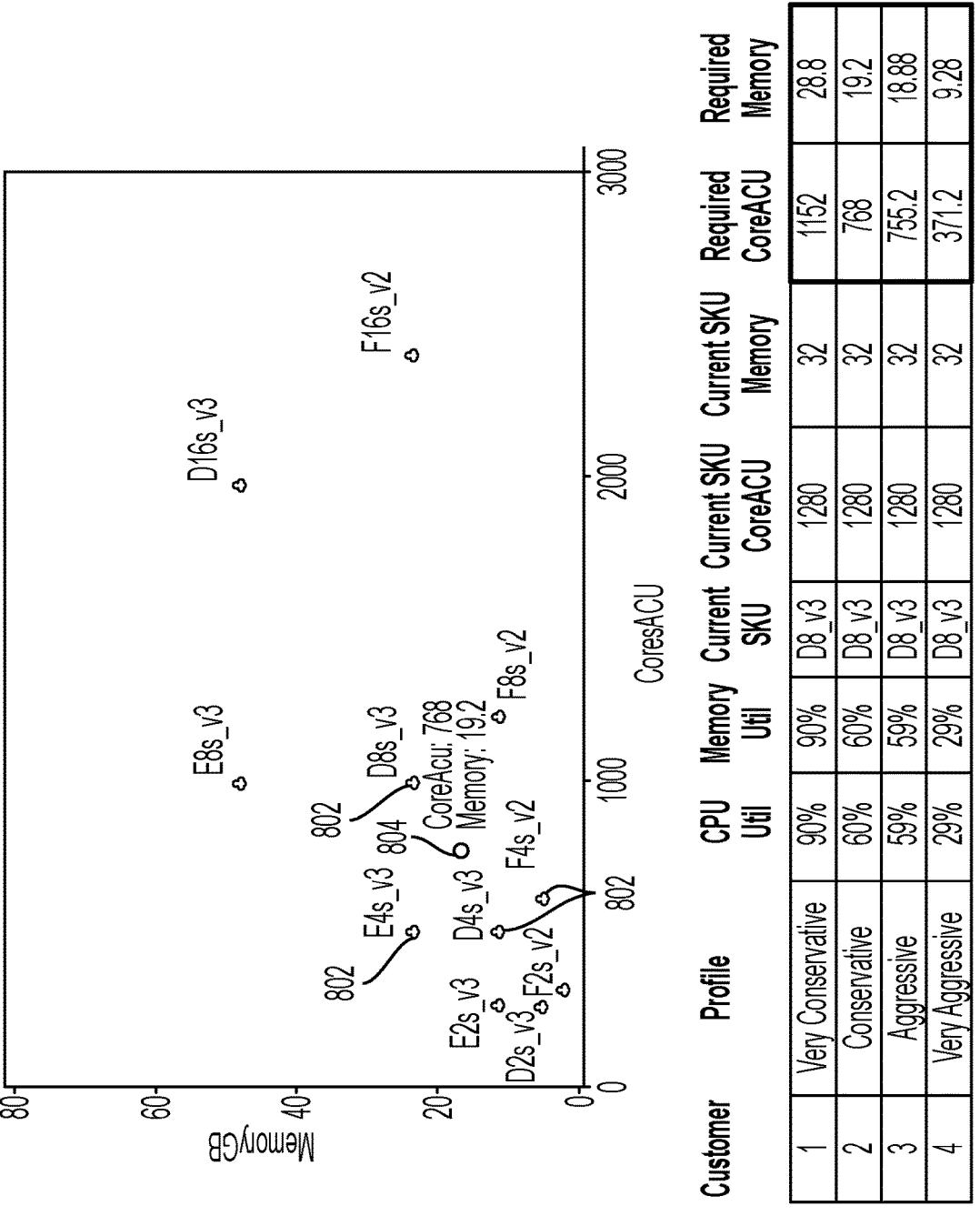

Referring to FIG. 8C, to add a workload profile of a desired resource device (e.g., a hypothetical resource device) 804 into the decision space at block 710 of FIG. 7A, in some embodiments, the recommendation service 112 (e.g., the rightsize recommendation generator 220) modifies the current capacity or capability of the relevant resource device 108 (e.g., a current resource device) based on the representative utilization calculated for the relevant resource device 108 (e.g., at block 315 of the method 300 of FIG. 3) to calculate the workload profile of the desired resource device 804. In the present example, the CoreACU and Memory of the relevant resource device 108 may be modified based on the representative CPU and memory utilization calculated for the relevant resource device 108. For example, a 90% CPU utilization on a 1280 CoreACU would result in a desired CoreACU of 1152. Accordingly, a 60% CPU representative utilization and a 60% memory representative utilization on a relevant resource device (e.g., Current SKU) having a CoreACU of 1280 and memory of 32 GB would result in a desired CoreACU of 768 and a desired memory of 19.2 GB. Thus, as shown in FIG. 8C, which represents the decision space for the user having the conservative profile (e.g., customer 2), the desired resource device 804 having the desired CoreACU and memory is added into the relevant decision space.

Figure 8D:
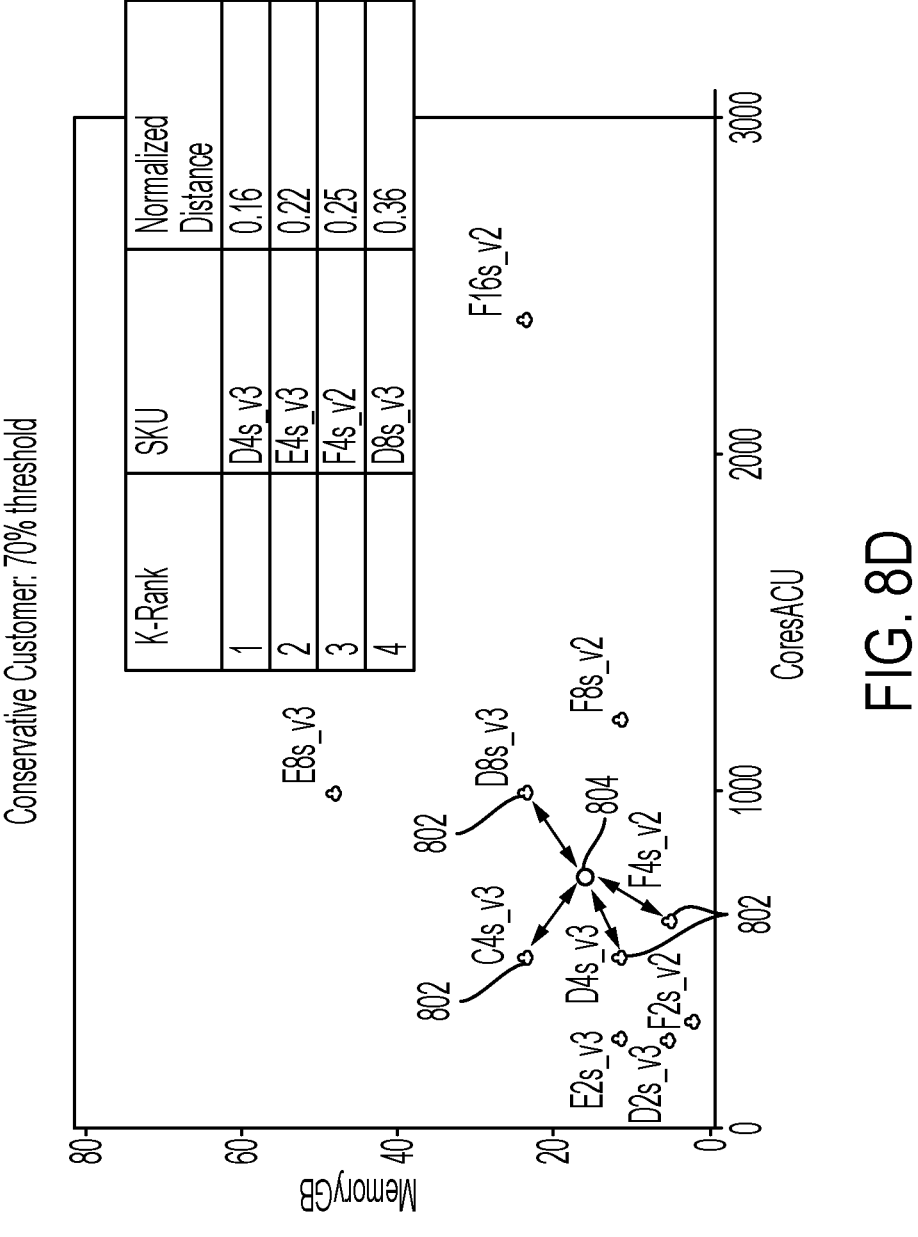

Referring to FIG. 8D, to search and rank the potential candidate devices at block 720 of FIG. 7A, in some embodiments, the closest (e.g., adjacent) potential candidate devices 802 to the desired resource device 804 are identified and ranked based on a distance metric from the desired resource device 804. In some embodiments, because the rightsize recommendation generator 220 uses the KNN model that uses a Ball-Tree algorithm, the search complexity is reduced. Moreover, the Ball-Tree algorithm also surfaces the closest potential candidate devices by rank, enabling the subsequent filtering (e.g., at block 725 of FIG. 7A) to be performed more rapidly.

Referring to FIG. 8E, the top ranked potential candidate devices 802 are filtered to identify a suitable candidate device that satisfies all constraints. As an illustrative example, one constraint may be that the desired utilization is smaller than (less than) the threshold adjusted capacity. In this case, as shown in FIGS. 8D and 8E, the threshold adjusted capacity of the potential candidate devices D4s_v3, E4s_v3, and F4s_v2 from among the ranked potential candidate devices 802 all have a CoreACU that is smaller than the desired CoreACU, and thus, this constraint is not satisfied. On the other hand, the threshold adjusted capacity of the potential candidate device D8s_v3 from among the ranked potential candidate devices 802 has a CoreACU that is greater than or equal to the desired CoreACU and memory that is greater than or equal to the desired memory. Thus, potential candidate device D8s_v3 is identified as satisfying this constraint.

In more detail, as discussed above, the filtering of the top ranked potential candidate devices 802 at block 725 of FIG. 7A includes identifying one or more constraints at block 740 of FIG. 7B. The one or more constraints may depend on a type or kind of the relevant resource device 108. In the present example, the one or more constraints include the desired CPU utilization being smaller than the threshold adjusted CPU utilization of a potential candidate device under consideration, and the desired memory utilization being smaller than the threshold adjusted memory utilization of the potential candidate device under consideration.

The threshold adjusted CPU utilization and the threshold adjusted memory utilization of each of the top ranked potential candidate devices 802 identified at block 720 of FIG. 7A are compared with the desired CPU utilization and the desired memory utilization, respectively, of the desired resource device 804 at block 745 of FIG. 7B. Once a suitable candidate device 802 is identified at block 755 of FIG. 7B, or a no rightsize recommendation is generated at block 765 of FIG. 7B, an appropriate recommendation is provided to the user at block 335 of FIG. 3 (e.g., via a graphical user interface).

Accordingly, as discussed in more detail below with reference to FIGS. 9A and 9B, unlike recommendations that are generated based on rule-based models and hard-coded values, which may result in the same recommendation being provided regardless of the needs of different users, the personalized recommendations are generated based on the user defined personalization parameters, and thus, the recommendations may be tailored to the needs of various different users.

FIG. 9A is a table illustrating a recommendation generated based on received personalized profile parameters according to one or more embodiments of the present disclosure. FIG. 9B is a table illustrating a recommendation generated based on hard-coded values, as a comparative example.

For example, FIG. 9A shows a table 900 in which a rightsize recommendation 902 is generated for four (4) users (e.g., customers 1 through 4) having different recommendation profiles (e.g., very conservative to very aggressive) based on the representative utilization 502 and the received personalization profile parameters 904, according to an embodiment of the present disclosure. FIG. 9B shows a table 950 in which a rightsize recommendation 952 is generated for four (4) users (e.g., customers 1 through 4) having different recommendation profiles (e.g., very conservative to very aggressive) based on the representative utilization 552 and the hard-coded values 954, as a comparative example. For comparative purposes, the utilization data 504 and 556 (e.g., see FIGS. 5A and 5B) used to generate the rightsize recommendations for each of the four (4) users are the same. It should be appreciated that, in practice, the utilization data 504 and 556 for each of the four (4) users (e.g., customers 1 through 4) may be different.

As shown in FIG. 9A, when the rightsize recommendation is generated based on the received personalization profile parameters 904, which results in different representative utilizations 502, the different users (e.g., customers 1 through 4) having different recommendation profiles (e.g., very conservative to very aggressive) may receive different rightsize recommendations 902, even when the utilization data is the same for each of the different users. In comparison, referring to FIG. 9B, when the rightsize recommendation is generated based on hard-coded values 954, which results in the same representative utilizations 552, the different users (e.g., customers 1 through 4) having different recommendation profiles (e.g., very conservative to very aggressive) may receive the same rightsize recommendation 952, irrespective of the users' recommendation profiles and needs.

Figure 10B:
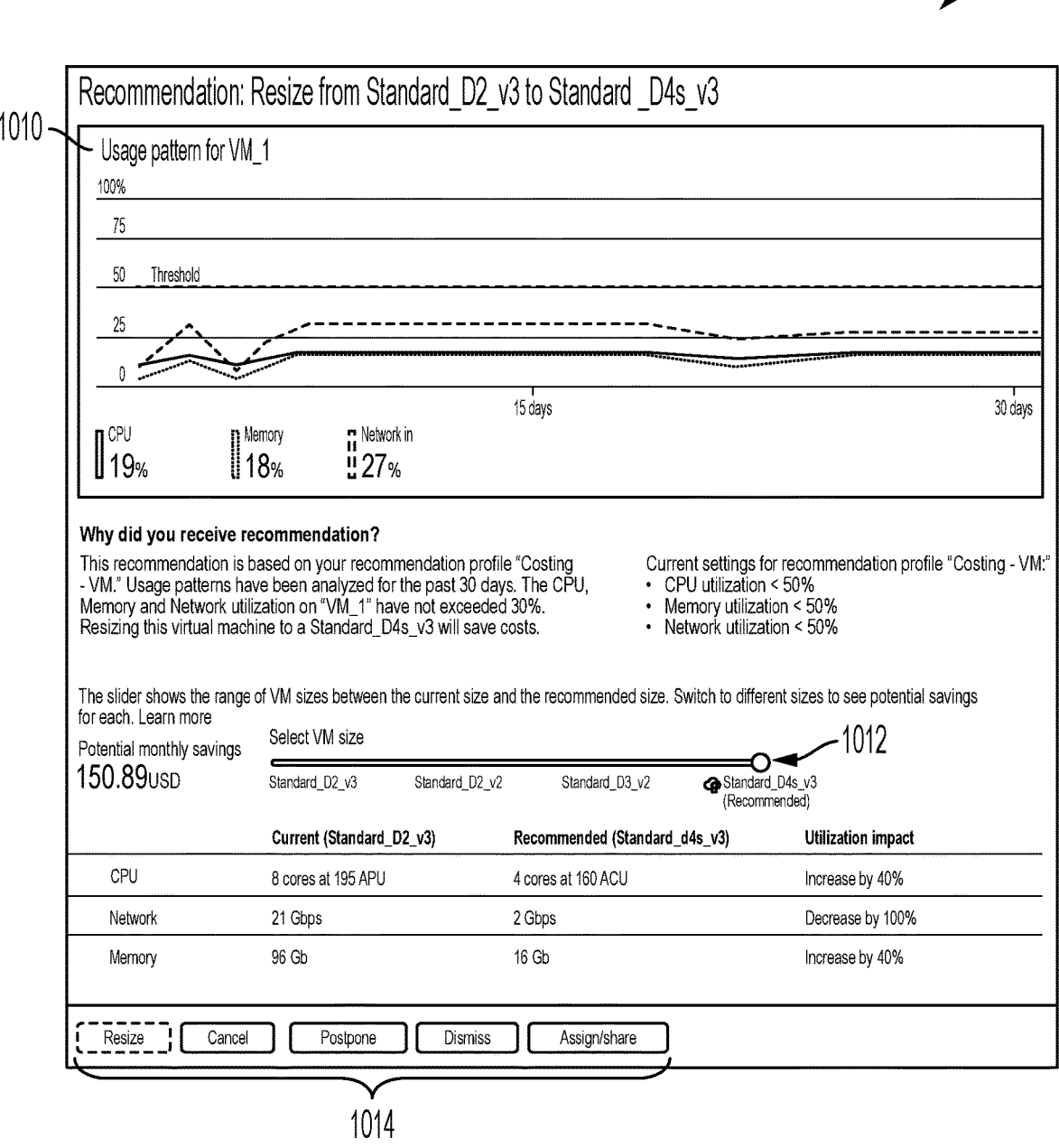

FIGS. 10A-10B illustrate a schematic graphical user interface according to one or more embodiments of the present disclosure.

Referring to FIG. 10A, to enable a level of personalization as described above, a graphical user interface (GUI) 1000 (which may include one or more pages, views, or links) may be presented (e.g., displayed) to the user via the user device 102. The GUI 1000 may enable the user to create a user profile 1002, and provide various personalization profile parameter values 1004, 1006, and 1008. The user profile 1002 may include a scope of resources (e.g., all resource devices under a subscription, a resource group, or specifically tagged resource devices), and the personalization profile parameter values 1004, 1006, and 1008 may be applicable to the scope of resources. The personalization profile parameter values 1004, 1006, and 1008 in the example shown in FIG. 10A may enable the user to define preferences for the types or kinds of potential candidate devices (e.g., devices having target SKU configurations) 1004 that may be considered for the recommendation (e.g., a rightsize recommendation), the thresholds (e.g., target thresholds) 1006 that may be used to adjust the capacity or capability of the potential candidate devices 1004 as discussed above, a time range parameter 1008 that may limit an amount of the telemetry data that may be aggregated for the relevant resource device 108, and/or the like.

Referring to FIG. 10B, one or more personalized recommendations may be generated based on the personalized profile parameter values defined by the user, and provided to the user device 102 of the user via the GUI 1000. The example shown in FIG. 10B shows a rightsize recommendation, where the user is recommended to rightsize a VM from a Standard_D2_v3 to a Standard_D4s_v3 resource device. This recommendation is generated based on the personalization profile parameter values 1004, 1006, and 1008 received from the user, which may be called out in text on the GUI 1000 (e.g., another area or another page of the GUI 1000), as well as depicted on a utilization graph 1010. The user is also provided alternative options 1012 for resource devices, which may result in less (or more) cost savings for resource devices having performance/reliability comparable to the recommended resource device. In some embodiments, various action selectors (e.g., buttons) 1014 are provided that, when selected, may automatically act on the recommendation as needed or desired. For example, in some embodiments, the action selectors 1014 include a rightsize selector that when selected, automatically implements the recommended device to replace the relevant resource device 108. However, the GUI 1000 shown in FIGS. 10A and 10B are provided as an example, and thus, may be modified according to various embodiments.

According to one or more embodiments of the present disclosure described above, a provider system may generate and provide one or more personalized recommendations to a user of one or more resource devices of the provider system based on received personalized parameter values that enable the user to define how the recommendations are generated. For example, the user may provide values for personalization parameters to indicate how utilization data of a relevant resource device are generated, parameters indicating how a representative utilization of the relevant resource devices are calculated from the generated utilization data, and parameters indicating threshold limits on the recommendations generated by the provider system. Thus, one or more personalized recommendations that may be catered to various different needs of various different users may be provided.

FIGS. 11-14 and the associated descriptions provide a discussion of a variety of operating environments in which aspects of the disclosure may be practiced. However, the devices and systems illustrated and discussed with respect to FIGS. 11-14 are for purposes of example and illustration, and, as is understood, a vast number of computing device configurations may be utilized for practicing aspects of the present disclosure, described herein.

Figure 11:
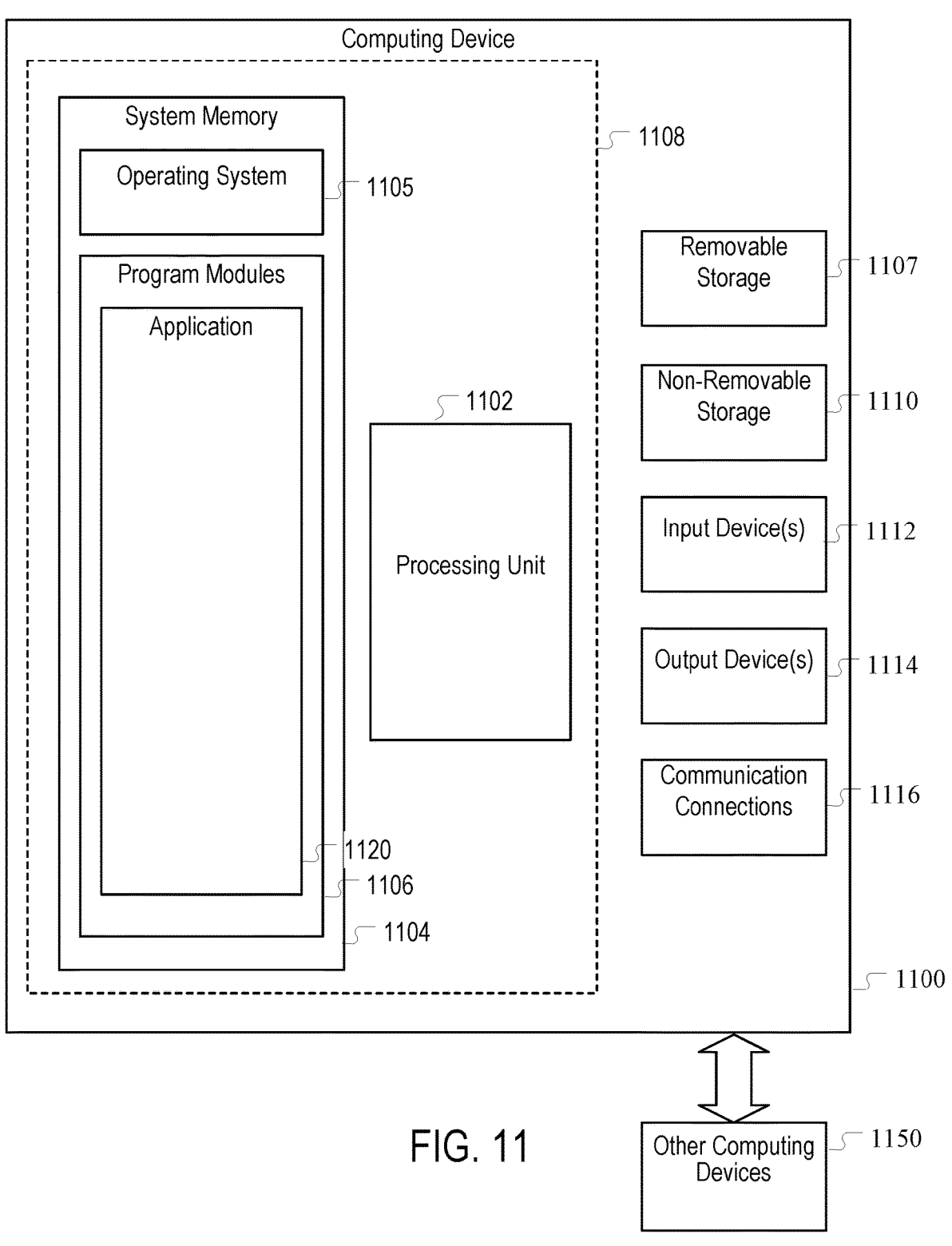
FIG. 11 is a block diagram illustrating example physical components of a computing device according to one or more embodiments of the present disclosure.

FIG. 11 is a block diagram illustrating example physical components (e.g., hardware) of a computing device 1100 according to one or more embodiments of the present disclosure.

The computing device components described below may be suitable for the computing devices and systems described above. In a basic configuration, the computing device 1100 includes a processing system comprising at least one processing unit 1102 and a system memory 1104. Depending on the configuration and type of computing device, the system memory 1104 may comprise volatile storage (e.g., random access memory), non-volatile storage (e.g., read-only memory), flash memory, or any combination of such memories.

The system memory 1104 includes an operating system 1105 and one or more program modules 1106 suitable for running software application 1120, such as one or more components supported by the systems described herein. The operating system 1105, for example, may be suitable for controlling the operation of the computing device 1100.

Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1107 and a non-removable storage device 1110.

As stated above, a number of program modules and data files may be stored in the system memory 1104. While executing on the processing unit 1102, the program modules 1106 (e.g., application 1120) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1107, and the non-removable storage device 1110 are all computer storage media examples (e.g., memory storage). Computer storage media may include random access memory (RAM), read-only memory (ROM), electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

Figure 12A:
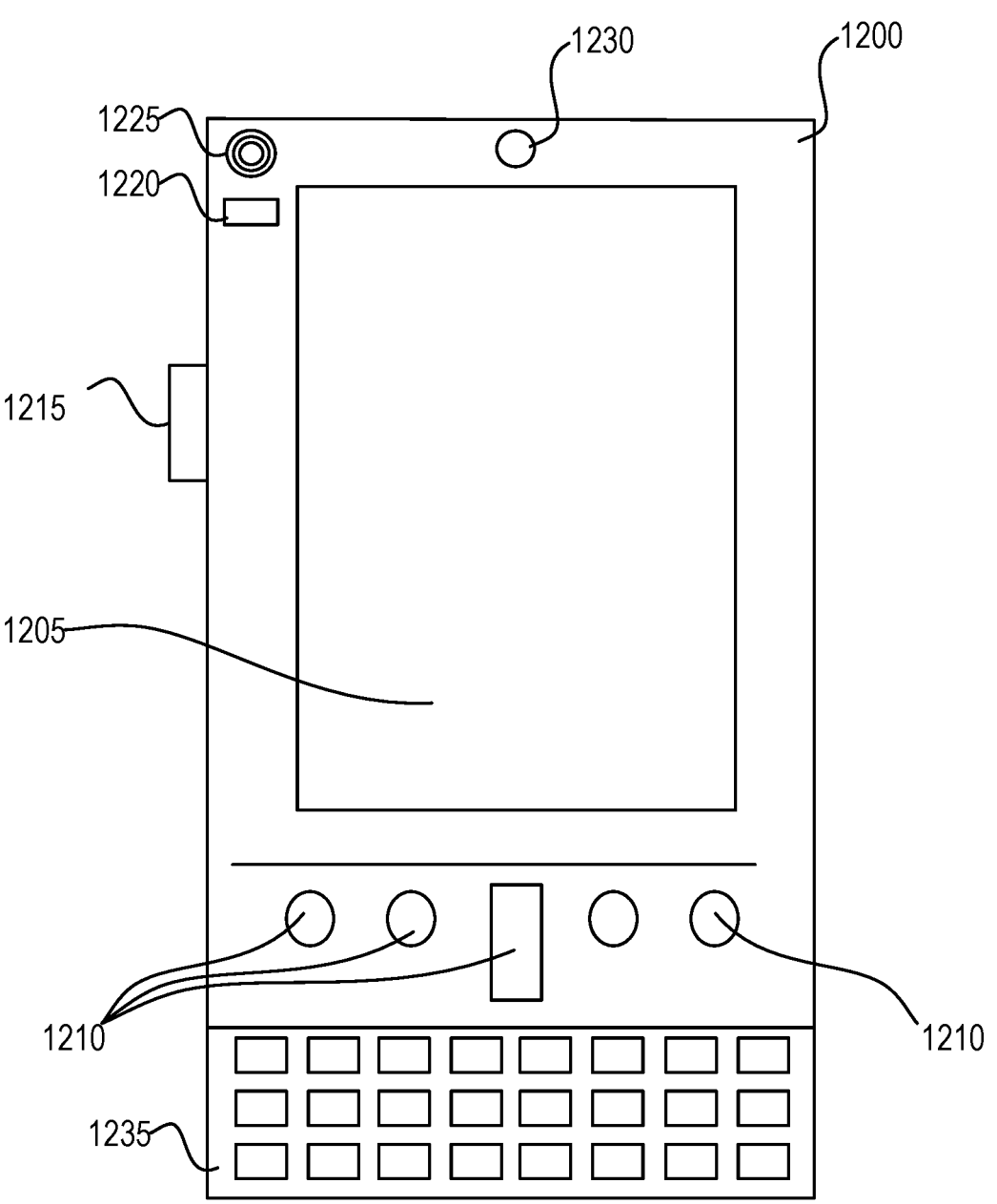
FIGS. 12A-12B are simplified block diagrams of an example mobile computing device according to one or more embodiments of the present disclosure.
Figure 12B:
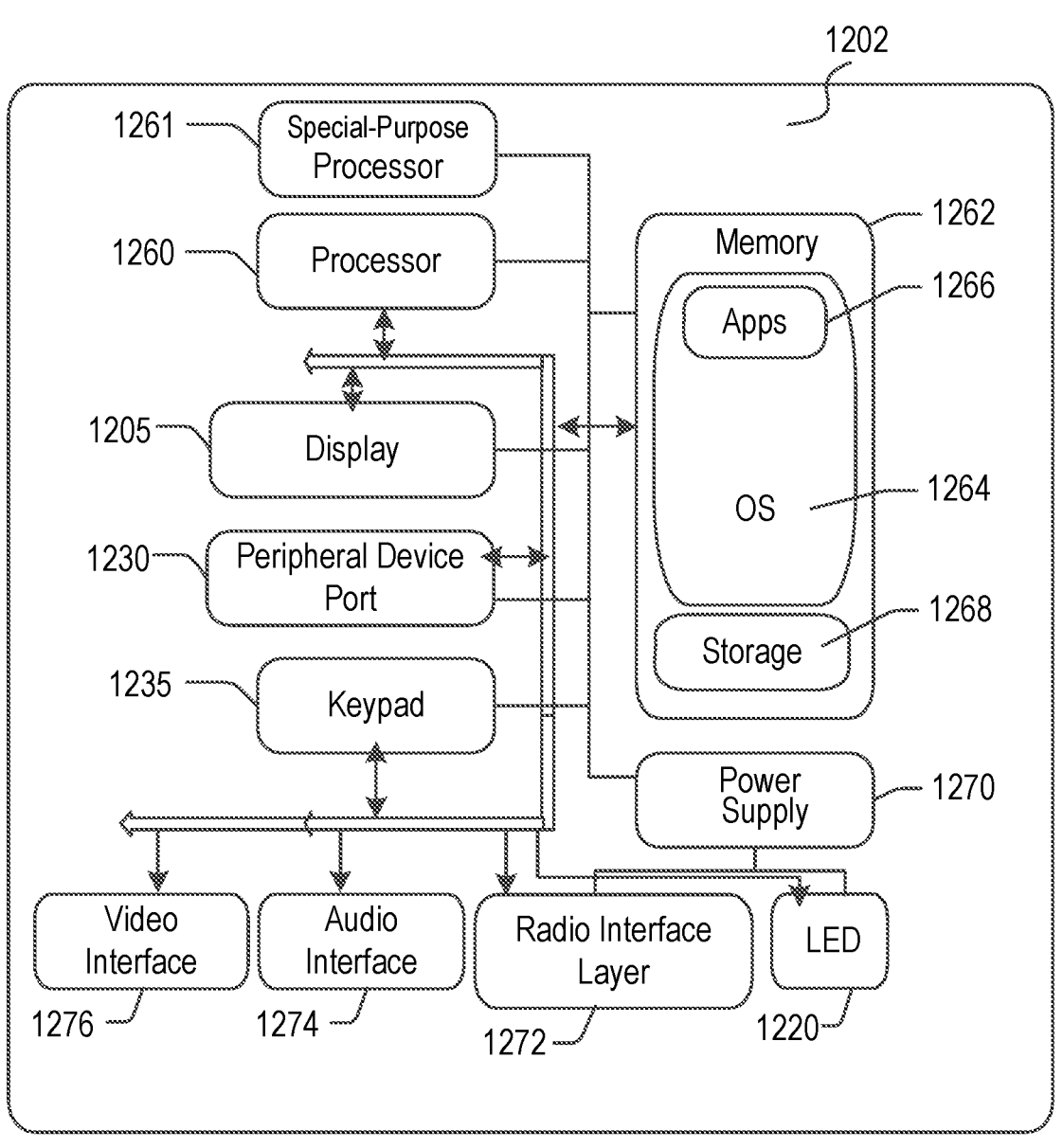

FIGS. 12A and 12B are simplified block diagrams of an example mobile computing device according to one or more embodiments of the present disclosure.

FIGS. 12A and 12B illustrate a mobile computing device 1200, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display).

If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some embodiments.

In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display.

In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200 described herein (e.g., search engine, extractor module, relevancy ranking module, answer scoring module).

The system 1202 has a power supply 1270, which may be implemented as one or more batteries. The power supply 1270 might further include an external power source, such as an AC adapter or a powered docking cradle that supplements or recharges the batteries.

The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator (e.g., light emitting diode (LED) 1220) may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor(s) (e.g., processor 1260 and/or special-purpose processor 1261) and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of a peripheral device port 1230 (e.g., an on-board camera) to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

Figure 13:
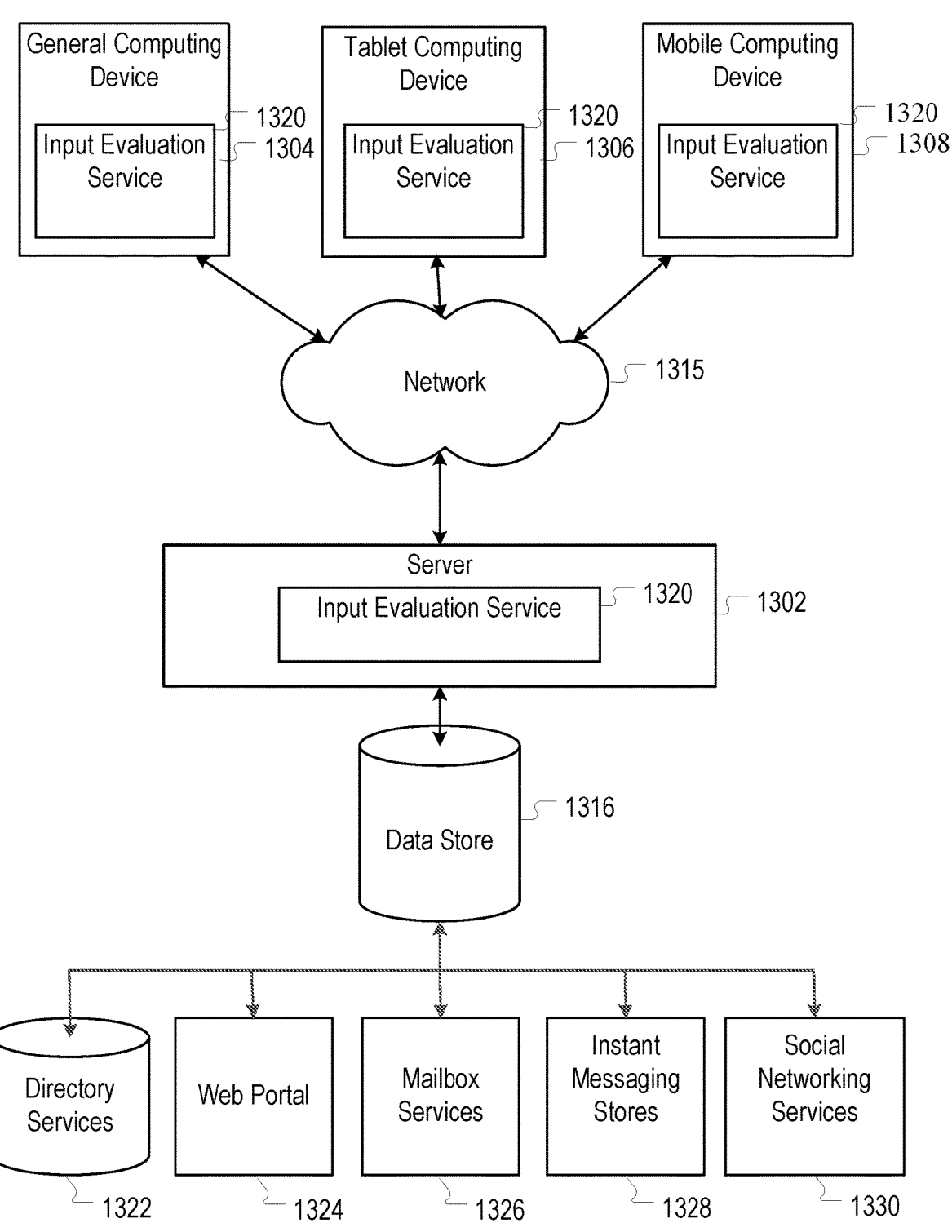
FIG. 13 is a simplified block diagram of an example distributed computing system according to one or more embodiments of the present disclosure.

FIG. 13 is a simplified block diagram of an example distributed computing system according to one or more embodiments of the present disclosure.

FIG. 13 illustrates one aspect of the architecture of a system for processing data received at a computing system from a remote source, such as a personal computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330.

An input evaluation service 1320 may be employed by a client that communicates with server device 1302, and/or input evaluation service 1320 may be employed by server device 1302. The server device 1302 may provide data to and from a client computing device such as a personal computer 1304, a tablet computing device 1306 and/or a mobile computing device 1308 (e.g., a smart phone) through a network 1315. By way of example, the computer system described above may be embodied in a personal computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Figure 14:
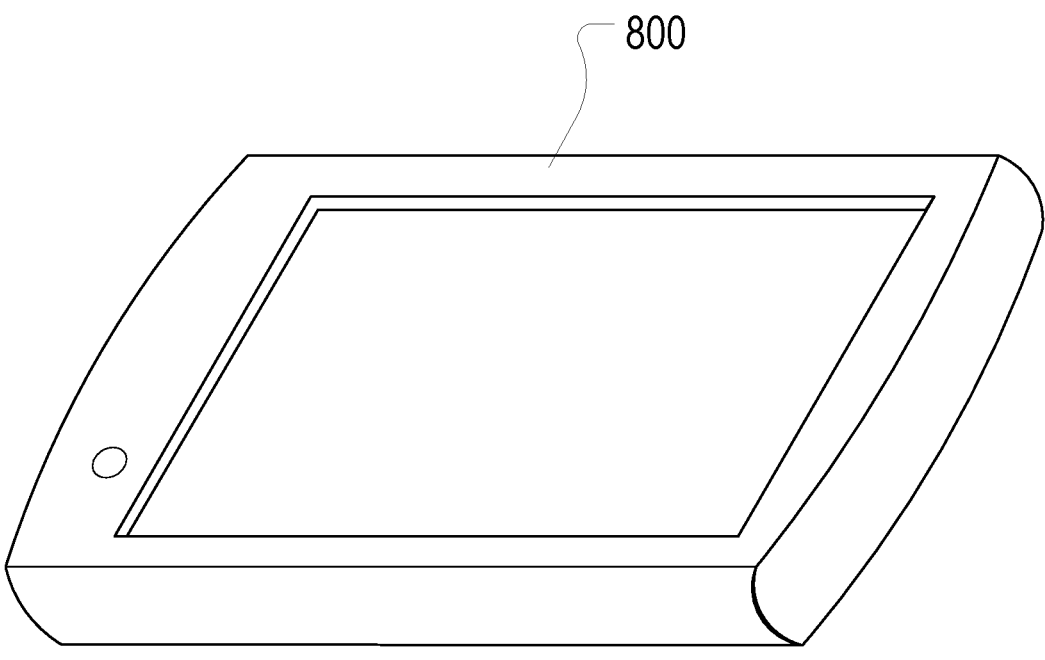
FIG. 14 illustrates an example tablet computing device for executing one or more aspects of one or more embodiments of the present disclosure.

FIG. 14 illustrates an example tablet computing device 1400 for executing one or more aspects of one or more embodiments of the present disclosure.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one example of the technology relates to a system including: a processor; and memory including instructions that, when executed by the processor, cause the processor to perform a method. The method includes: receiving personalization profile parameters from a user of a relevant resource device; calculating a representative utilization of the relevant resource device based on the personalization profile parameters; and generating a recommendation based on the representative utilization and the personalization profile parameters.

In another example, the technology relates to a computer-implemented method. The method includes receiving personalization profile parameters from a user of a relevant resource device; receiving a representative utilization of the relevant resource device based on a percentile of utilization data for the relevant resource device; and generating a recommendation based on the representative utilization and a selected value of a recommendation preference parameter of the personalization profile parameters.

In another example, the technology relates to computer readable media containing program instructions that, when executed by a processor, cause the processor to perform operations. The operations include: receiving personalization profile parameters from a user via a user interface displayed on a user device; calculating a representative utilization of a relevant resource device accessible by the user based on the personalization profile parameters; generating a recommendation based on the representative utilization and the personalization profile parameters; and transmitting the recommendation to the user device to be displayed on the graphical user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processing circuit; and
memory comprising instructions that, when executed by the processing circuit, cause the processing circuit to:
receive, by a profile parameterizer of the processing circuit, personalization profile parameters from a user of a relevant resource device, wherein the personalization profile parameters include values, specified by the user, for configuring an operational performance of the relevant resource device;
generate, by a data aggregator of the processing circuit, utilization data by aggregating telemetry data for the relevant resource device based on a data aggregation parameter of the personalization profile parameters, wherein the data aggregation parameter specifies a time interval at which the telemetry data is collected;
calculate, by a utilization calculator of the processing circuit, a representative utilization of the relevant resource device based on the personalization profile parameters and the utilization data, wherein the representative utilization:
is a calculated percentile of the utilization data that is based on a percentile parameter of the personalization profile parameters; and
represents an amount of operational utilization of the relevant resource device for achieving a stated performance objective of the user for the relevant resource device;
generate, by a recommendation selector of the processing circuit, a recommendation based on the representative utilization and the personalization profile parameters, wherein generating the recommendation comprises:
determining a first workload profile for a desired resource device based on the representative utilization;

selecting at least one candidate resource device from among a set of candidate devices based on the representative utilization, wherein a second workload profile for the at least one candidate resource device is similar to the first workload profile for the desired resource device; and including the at least one candidate resource device in the recommendation based on similarity between the first workload profile and the second workload profile; and provide the recommendation for display in a user interface of a display device, the user interface comprising an action selector that, when selected, causes implementation of the at least one candidate resource device.

2. The system of claim 1, wherein a graphical user interface is transmitted to a user device of the user to receive the personalization profile parameters.

3. The system of claim 2, wherein the user device is the display device and to be displayed on the graphical user interface is the user interface of the display device.

4. The system of claim 1, wherein two recommendations are generated concurrently, the two recommendations comprising the recommendation.

5. The system of claim 1, wherein to determine the recommendation to generate, the instructions further cause the processing circuit to encode a selected value of a recommendation preference parameter of the personalization profile parameters as a binary feature in a recommendation data structure.

6. The system of claim 1, wherein to generate the recommendation, the instructions further cause the processing circuit to:

identify a plurality of potential candidate devices;

calculate an adjusted capacity of each of the plurality of potential candidate devices based on a threshold parameter of the personalization profile parameters;

determine a workload profile according to a current capacity of the relevant resource device modified by the representative utilization of the relevant resource device; and calculate a distance metric between the workload profile and a capacity of adjacent ones of the plurality of potential candidate devices.

7. The system of claim 6, wherein the instructions further cause the processing circuit to:

rank each of the adjacent ones of the plurality of potential candidate devices based on the distance metric; and compare a threshold adjusted capacity of each ranked potential candidate device with the workload profile of a desired resource device.

8. A method comprising:

receiving, by a profile parameterizer implemented in memory of a processing circuit of a recommendation service device, personalization profile parameters from a user of a relevant resource device, wherein the personalization profile parameters include values, specified by the user, for configuring an operational performance of the relevant resource device;

generating, by a data aggregator implemented by the processing circuit, utilization data by aggregating telemetry data for the relevant resource device based on a data aggregation parameter of the personalization profile parameters, wherein the data aggregation parameter specifies a time interval at which the telemetry data is collected;

receiving, by a recommendation selector implemented by the processing circuit, a representative utilization of the relevant resource device based on the personalization profile parameters and the utilization data, wherein the representative utilization:

is a calculated percentile of the utilization data that is based on a percentile parameter of the personalization profile parameters; and represents an amount of operational utilization of the relevant resource device for achieving a stated performance objective of the user for the relevant resource device; and generating, by the recommendation selector, a recommendation based on the representative utilization and a selected value of a recommendation preference parameter of the personalization profile parameters, wherein generating the recommendation comprises:

determining a first workload profile for a desired resource device based on the representative utilization;

selecting at least one candidate resource device from among a set of candidate devices based on the representative utilization, wherein a second workload profile for the at least one candidate resource device is similar to the first workload profile for the desired resource device; and including the at least one candidate resource device in the recommendation based on similarity between the first workload profile and the second workload profile;

providing the recommendation for display in a user interface of a display device, the user interface comprising an action selector that, when selected, causes implementation of the at least one candidate resource device; and in response to receiving a selection of the action selector via the user interface, executing the recommendation to implement the at least one candidate resource device.

9. The method of claim 8, further comprising:

identifying, by the recommendation selector, a first recommendation to generate based on a first selected value of a recommendation preference parameter of the personalization profile parameters;

identifying, by the recommendation selector, a second recommendation to generate based on a second selected value of the recommendation preference parameter of the personalization profile parameters; and generating, by the recommendation selector, the first recommendation and the second recommendation concurrently with each other.

10. The method of claim 8, wherein generating the recommendation comprises encoding, by the processing circuit, a selected value of a recommendation preference parameter of the personalization profile parameters as a binary feature in a recommendation data structure.

11. The method of claim 8, wherein generating the recommendation comprises:

identifying, by the processing circuit, a plurality of potential candidate devices;

calculating, by the processing circuit, an adjusted capacity of each of the plurality of potential candidate devices based on a threshold parameter of the personalization profile parameters;

determining, by the processing circuit, a workload profile of a desired resource device according to a current capacity of the relevant resource device modified by the representative utilization of the relevant resource device; and calculating, by the processing circuit, a distance metric between the workload profile of the desired resource device and the adjusted capacity of adjacent ones of the plurality of potential candidate devices.

12. The method of claim 11, further comprising:

ranking, by the processing circuit, each of the adjacent ones of the plurality of potential candidate devices based on the distance metric;

comparing, by the processing circuit, a threshold adjusted capacity of each ranked potential candidate devices with the workload profile of the desired resource device; and identifying, by the processing circuit, a replacement device from among the ranked potential candidate devices based on the comparing.

13. A computer readable media containing program instructions that, when executed by a processing circuit comprising memory, cause the processing circuit to perform operations comprising:

receiving, by a profile parameterizer of the processing circuit, personalization profile parameters from a user via a graphical user interface displayed on a user device, wherein the personalization profile parameters include values, specified by the user, for configuring an operational performance of a relevant resource device;

generate, by a data aggregator of the processing circuit, utilization data by aggregating telemetry data for the relevant resource device based on a data aggregation parameter of the personalization profile parameters, wherein the data aggregation parameter specifies a time interval at which the telemetry data is collected;

calculating, by a utilization calculator of the processing circuit, a representative utilization of the relevant resource device accessible by the user based on the personalization profile parameters and the utilization data, wherein the representative utilization:

is a calculated percentile of the utilization data that is based on a percentile parameter of the personalization profile parameters; and represents an amount of operational utilization of the relevant resource device for achieving a stated performance objective of the user for the relevant resource device;

generating, by a recommendation selector of the processing circuit, a recommendation based on the representative utilization and the personalization profile parameters, wherein generating the recommendation comprises:

determining a first workload profile for a desired resource device based on the representative utilization;

selecting at least one candidate resource device from among a set of candidate devices based on the representative utilization, wherein a second workload profile for the at least one candidate resource device is similar to the first workload profile for the desired resource device; and including the at least one candidate resource device in the recommendation based on similarity between the first workload profile and the second workload profile;

transmitting the recommendation to the user device to be displayed on the graphical user interface; and in response to receiving an input to execute the recommendation, executing the recommendation to implement the at least one candidate resource device.

14. The computer readable media of claim 13, wherein to generate the recommendation, the program instructions further cause the processing circuit to perform operations comprising:

identifying a plurality of potential candidate devices;

calculating an adjusted capacity of each of the plurality of potential candidate devices based on a threshold parameter of the personalization profile parameters;

determining a workload profile of a desired resource device according to a current capacity of the relevant resource device modified by the representative utilization of the relevant resource device; and calculating a distance metric between the workload profile of the desired resource device and the adjusted capacity of adjacent ones of the plurality of potential candidate devices.

15. The computer readable media of claim 14, wherein the program instructions further cause the processing circuit to perform operations comprising:

ranking each of the adjacent ones of the plurality of potential candidate devices based on the distance metric;

comparing a threshold adjusted capacity of each ranked potential candidate devices with the workload profile of the desired resource device; and identifying a replacement device from among the ranked potential candidate devices based on the comparing.

16. The computer readable media of claim 14, wherein the recommendation is one of:

a shutdown recommendation;

a rightsize recommendation; or a burstable recommendation.

17. The computer readable media of claim 14, wherein generating the recommendation comprises:

selecting, by the recommendation selector, one or more recommendation generators implemented by the processing circuit; and using a selected recommendation generator of the one or more recommendation generators to generate the recommendation.

18. The computer readable media of claim 14, wherein the data aggregation parameter specifies one of:

an average/average value;

an average/maximum value; or a maximum/maximum value.

19. The system of claim 1, wherein similarity between the first workload profile and the second workload profile is based on a desired central processing unit (CPU) utilization of the desired resource device being less than an adjusted CPU utilization of the at least one candidate resource device.

20. The system of claim 1, wherein similarity between the first workload profile and the second workload profile is based on a desired memory utilization of the desired resource device being less than a memory utilization of the at least one candidate resource device.

* * * * *